US008423826B2

(12) United States Patent
Morimura et al.

(10) Patent No.: US 8,423,826 B2
(45) Date of Patent: Apr. 16, 2013

(54) METHOD, APPARATUS AND SYSTEM FOR DISPLAYING RESULT OF FAILURE ROOT CAUSE ANALYSIS

(75) Inventors: Tomohiro Morimura, Kawasaki (JP); Kiminori Sugauchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 633 days.

(21) Appl. No.: 12/664,382

(22) PCT Filed: Oct. 22, 2009

(86) PCT No.: PCT/JP2009/005560
§ 371 (c)(1),
(2), (4) Date: Dec. 11, 2009

(87) PCT Pub. No.: WO2011/039825
PCT Pub. Date: Apr. 7, 2011

(65) Prior Publication Data
US 2011/0209010 A1    Aug. 25, 2011

(30) Foreign Application Priority Data
Sep. 30, 2009   (JP) .................................. 2009-225859

(51) Int. Cl.
*G06F 11/00* (2006.01)
(52) U.S. Cl.
USPC ............................................. 714/25; 714/39
(58) Field of Classification Search ...................... 714/25
See application file for complete search history.

(56) References Cited

U.S. PATENT DOCUMENTS

| 5,737,520 | A  | * | 4/1998  | Gronlund et al. ............... 714/39 |
| 6,249,755 | B1 | * | 6/2001  | Yemini et al. .................. 702/183 |
| 6,738,933 | B2 | * | 5/2004  | Fraenkel et al. .............. 714/47.2 |
| 7,203,624 | B2 | * | 4/2007  | Warshawsky .................. 702/186 |
| 7,552,447 | B2 | * | 6/2009  | Uthe .............................. 719/318 |
| 2005/0278273 | A1 | * | 12/2005 | Uthe ................................. 707/1 |
| 2006/0269297 | A1 | * | 11/2006 | Robinson .......................... 399/9 |
| 2011/0145269 | A1 | * | 6/2011  | Kraftsow et al. ............. 707/766 |
| 2011/0265006 | A1 | * | 10/2011 | Morimura et al. ............ 715/736 |
| 2011/0314138 | A1 | * | 12/2011 | Kobayashi et al. ........... 709/222 |

FOREIGN PATENT DOCUMENTS

| JP | 05-114899 | 5/1993 |
| JP | 09-160849 | 6/1997 |
| JP | 2007-293489 | 11/2007 |

OTHER PUBLICATIONS

Oyamada, Satoshi, et al.; Development of Network Operation Knowledge System; NTT DoCoMo Technical Journal vol. 12, No. 2; Jul. 1, 2004; pp. 43-51; (English-language translation 26 pages).
PCT Search Report and Written Opinion of the International Searching Authority on application No. PCT/JP2009/005560; Dec. 8, 2009; 9 pages; (Partial English-language translation 2 pages).
Forgy, C., "Rete: A Fast Algorithm for the Many Pattern/Many Object Pattern Match Problem", *Artificial Intelligence*, vol. 19, No. 1, (1982) pp. 17-37.

* cited by examiner (Continued)

*Primary Examiner* — Kamini Patel
(74) *Attorney, Agent, or Firm* — Foley & Lardner LLP

(57) ABSTRACT

A management system comprises at the least a first analysis rule information and a second analysis rule information, acquires a first analysis result and a second analysis result based on a detected status of an information processing apparatus, and aggregates and displays a first analysis result and a second analysis result based on (A) a cause denoted by an analysis result, (B) a status condition of analysis rule information that forms the basis for the analysis result, or (C) a detected status.

14 Claims, 29 Drawing Sheets

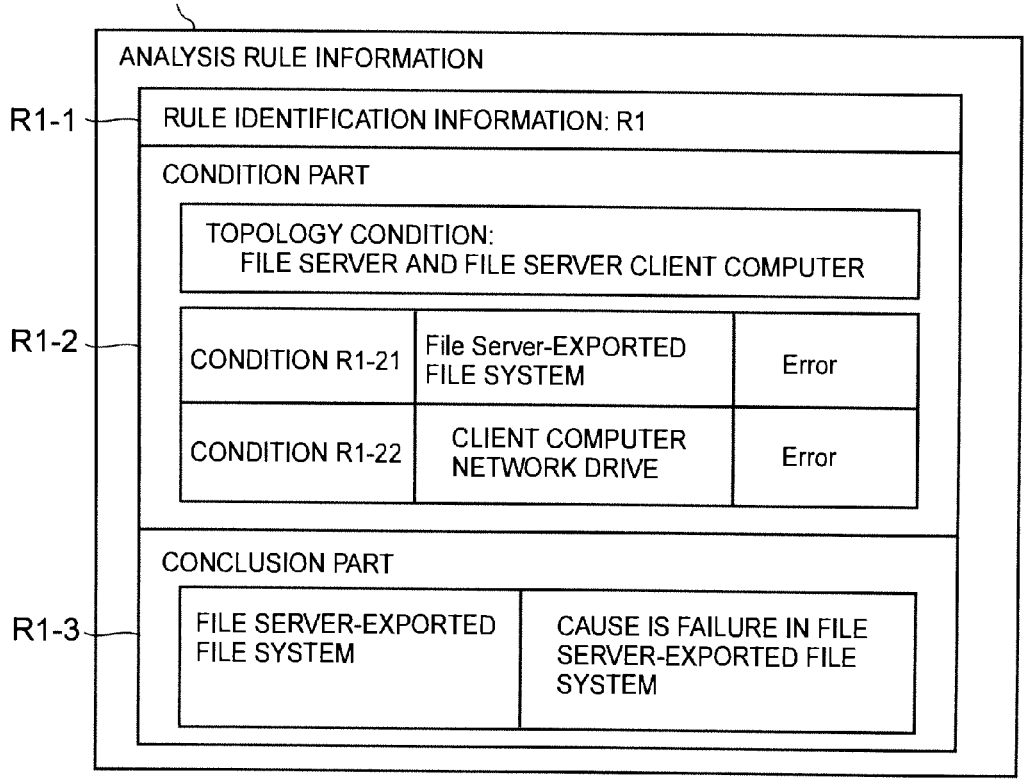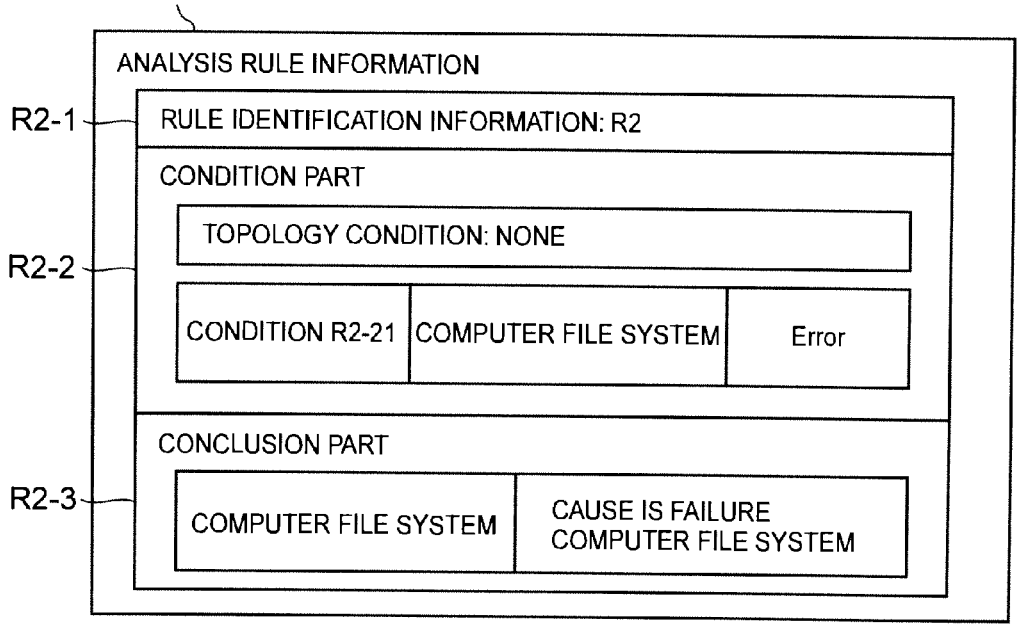
Fig. 3

102-1

| ANALYSIS RESULT INFORMATION | |
|---|---|
| ANALYSIS ID | A-01 |
| ANALYSIS TIME | 2009-04-01-00-00-00-000 |
| CAUSE APPARATUS INFORMATION | Server : Srv01 |
| CAUSE COMPONENT INFORMATION | File System: /dev/sdb |
| CERTAINTY FACTOR | 50 |
| MESSAGE | CAUSE: FAILURE OF FILE SERVER (Srv-01)- EXPORTED FILE SYSTEM (/dev/sdb) |
| RECEIVED EVENT LIST | Srv01./dev/sdb.Error |
| APPLIED RULE ID | R1 |
| APPLIED COMPONENT ID | Srv01./dev/sdb.Srv05 |

102-2

| ANALYSIS RESULT INFORMATION | |
|---|---|
| ANALYSIS ID | A-02 |
| ANALYSIS TIME | 2009-04-01-00-00-00-100 |
| CAUSE APPARATUS INFORMATION | Server : Srv01 |
| CAUSE COMPONENT INFORMATION | File System: /dev/sdb |
| CERTAINTY FACTOR | 100 |
| MESSAGE | CAUSE: FAILURE OF SERVER (Srv-01) FILE SYSTEM (/dev/sdb) |
| RECEIVED EVENT LIST | Srv-01./dev/sdb.Error |
| APPLIED RULE ID | R2 |
| APPLIED COMPONENT ID | Srv01./dev/sdb |

| ANALYSIS RESULT INFORMATION ||
|---|---|
| ANALYSIS ID | A-03 |
| ANALYSIS TIME | 2009-04-01-00-00-00-200 |
| CAUSE APPARATUS INFORMATION | Storage Subsystem:Stg01 |
| CAUSE COMPONENT INFORMATION | FC Port:Ctr1-A.p01 |
| CERTAINTY FACTOR | 50 |
| MESSAGE | CAUSE: FAILURE OF STORAGE SUBSYSTEM (Stg01) FC Port (Ctrl-A.p01) OR APPARATUS CABLING |
| RECEIVED EVENT LIST | Stg01.Ctr1-A.p01.Error |
| APPLIED RULE ID | R3 |
| APPLIED COMPONENT ID | Stg01.Ctr1-A.p01,FCSw01.p01 |

102-4

| ANALYSIS RESULT INFORMATION ||
|---|---|
| ANALYSIS ID | A-04 |
| ANALYSIS TIME | 2009-04-01-00-00-00-600 |
| CAUSE APPARATUS INFORMATION | FC Switch :FcSw01, Storage Subsystem:Stg01 |
| CAUSE COMPONENT INFORMATION | FC Switch Port:p01 Storage Subsystem:Ct1-A.p01 |
| CERTAINTY FACTOR | 50 |
| MESSAGE | CAUSE: FAILURE OF FC SWITCH (FcSw01) PORT (p01) OR Storage Subsystem (Stg01) FC Port (Ctrl-A.p01) or APPARATUS CABLING |
| RECEIVED EVENT LIST | Stg01.Ctr1-A.p01,Error |
| APPLIED RULE ID | R4 |
| APPLIED COMPONENT ID | Stg01.Ctr1-A.p01,FCSw01.p01 |

| ANALYSIS RESULT INFORMATION ||
|---|---|
| ANALYSIS ID | A-05 |
| ANALYSIS TIME | 2009-04-01-00-00-00-200 |
| CAUSE APPARATUS INFORMATION | Storage Subsystem:Stg02 |
| CAUSE COMPONENT INFORMATION | FC Port:Ctr1-A.p02 |
| CERTAINTY FACTOR | 100 |
| MESSAGE | CAUSE: FAILURE OF STORAGE SUBSYSTEM (Stg02) FC Port (Ctrl-A.p02) or APPARATUS CABLING |
| RECEIVED EVENT LIST | Stg02.Ctr1-A.p02.Error<br>FcSw01.p05.Linkdown |
| APPLIED RULE ID | R3 |
| APPLIED COMPONENT ID | Stg02.Ctr1-A.p02,FCSw01.p05 |

102-6

| ANALYSIS RESULT INFORMATION ||
|---|---|
| ANALYSIS ID | A-06 |
| ANALYSIS TIME | 2009-04-01-00-00-00-600 |
| CAUSE APPARATUS INFORMATION | FC Switch :FcSw01,<br>Storage Subsystem:Stg02 |
| CAUSE COMPONENT INFORMATION | FC Switch Port:p05<br>FC Port:Ctr-A.p02 |
| CERTAINTY FACTOR | 50 |
| MESSAGE | CAUSE: FAILURE OF FC SWITCH (FcSw01) PORT (p01) or Storage Subsystem (Stg02) FC Port (Ctrl-A.p02) OR APPARATUS CABLING |
| RECEIVED EVENT LIST | Stg02.Ctr1-A.p02,Error |
| APPLIED RULE ID | R4 |
| APPLIED COMPONENT ID | Stg02.Ctr1-A.p02,FCSw01.p05 |

| ANALYSIS RESULT INFORMATION | |
|---|---|
| ANALYSIS ID | A-07 |
| ANALYSIS TIME | 2009-04-01-00-00-00-200 |
| CAUSE APPARATUS INFORMATION | Storage Subsystem:Stg03 |
| CAUSE COMPONENT INFORMATION | Controller:Ctr1-A |
| CERTAINTY FACTOR | 100 |
| MESSAGE | CAUSE: FAILURE OF STORAGE SUBSYSTEM (Stg03) CONTROLLER (Ctrl-A) |
| RECEIVED EVENT LIST | Stg03.Ctr1-A.Error<br>Stg03.Ctr1-A.p01.Error |
| APPLIED RULE ID | R5 |
| APPLIED COMPONENT ID | Stg03.Ctr1-A.p01 |

102-8

| ANALYSIS RESULT INFORMATION | |
|---|---|
| ANALYSIS ID | A-08 |
| ANALYSIS TIME | 2009-04-01-00-00-00-600 |
| CAUSE APPARATUS INFORMATION | Storage Subsystem:Stg03 |
| CAUSE COMPONENT INFORMATION | FC Port:Ctr1-A.p01 |
| CERTAINTY FACTOR | 100 |
| MESSAGE | CAUSE: FAILURE OF STORAGE SUBSYSTEM (Stg03) FC Port (Ctrl-A.p01) |
| RECEIVED EVENT LIST | Stg03.Ctr1-A.p01,Error |
| APPLIED RULE ID | R6 |
| APPLIED COMPONENT ID | Stg03.Ctr1-A.p01 |

Fig. 11

| | AGGREGATION TYPE | AGGREGATION CERTAINTY FACTOR | CAUSE LOCATION LIST | ANALYSIS RESULT LIST |
|---|---|---|---|---|
| L101 | APPARATUS AGGREGATION | 100 | Srv-01 | A-01,A-02 |
| L102 | COMPONENT AGGREGATION | 100 | Srv-01./dev/sdb | A-01,A-02 |
| | | | | |
| L103 | HIGHER-LEVEL AGGREGATION | 100 | Srv-01,FcSw01, Cable | A-03,A-04 |
| | | | | |
| L104 | EXCLUSIVE SELECTION | 100 | Stg-02.Ctr1-A.p05 Cable | A-05,A-06 |
| | | | | |
| L105 | INCLUSIVE AGGREGATION | 100 | Stg-03.Ctr1-A | A-07,A-08 |
| | | | | |

Fig. 12

| T2 | C201 CAUSE APPARATUS INFORMATION | C202 RELATED ANALYSIS ID LIST |
|---|---|---|
| L201 | Srv01 | A-01,A-02 |
| L202 | FCSw | A-04,A-06 |
| L203 | Stg01 | A-03,A-04 |
| L204 | Stg02 | A-05,A-06 |
| L205 | Stg03 | A-07,A-08 |

Fig. 13

| T3 | C301 | C302 | C303 |
|---|---|---|---|
| | CAUSE APPARATUS/ CAUSE COMPONENT INFORMATION | STATUS | RELATED ANALYSIS ID LIST |
| L301 | Srv01./dev/sdb | Error | A-01,A-02, |
| L302 | FCSw.p01 | | A-04 |
| L303 | FCSw.p05 | | A-06 |
| L304 | Stg01.Ctr1-A.p01 | | A-03,A-04 |
| L305 | Stg02.Ctr1-A.p02 | | A-05,A-06 |
| | Stg03.Ctr1-A | | A-07 |
| | Stg03.Ctr1-A.p01 | | A-08 |

| EVENT MANAGEMENT INFORMATION | |
|---|---|
| EVENT ID | 0031 |
| EVENT DETECTION TIME | 2009-03-31-00-00-00-000 |
| SOURCE APPARATUS ID | Server: Srv01 |
| SOURCE COMPONENT ID | FileSystem:/dev/sdb |
| STATUS | Error |
| DETAILS | ... |

Fig. 27

MANAGEMENT TARGET COMPOSITION INFORMATION

[Srv01: Server]
<Hardware>
CPU:...
NIC: N01(1Gb Ether)
HBA: HBA 1 having P01
Disk: SDA,SDB
...
<Connection>
N01: connected to Srv05.N01
P01: connected to FCSw.P11
...
<Configuration>
Hostname: Srv01
N01: 192.168.0.1/255.255.255.0
FS Export: SDB as "share"
Disk: use Stg01.LUN1 as SDC
...

[Srv05: Server]
<Hardware>
CPU:...
NIC: N01(1Gb Ether)
HBA: HBA 1 having P01
Disk: SDA,SDB
...
<Connection>
N01: connected to Srv01.N01
...
<Configuration>
Hostname: Srv05
N01: 192.168.0.2/255.255.255.0
FS Export: use Srv01. "share"as NetworkDrive-D
...

[FCSw01 : FC Switch]
<Hardware>
FC Port: P01,P05,P09,P11
...
<Connection>
P01: connected to Stg01.P01
P05: connected to Stg02.P02
P09: connected to Stg03.P03
P11: connected to Srv01.P01

<Configuration>
...

[Stg01: Storage Subsystem]
<Hardware>
Ctr1-A having P01
HDD: HDD1,HDD2
...
<Connection>
P01: connected to FCSw01.P01
<Configuration>
LUN1: HDD1+HDD2 with RAID1
...

[Stg02: Storage Subsystem]
<Hardware>
Ctr1-A having P01,P02
HDD: HDD1,HDD2
...
<Connection>
P02: connected to FCSw01.P05
<Configuration>
LUN1: HDD1+HDD2 with RAID1
...

[Stg03: Storage Subsystem]
<Hardware>
Ctr1-A having P01
HDD: HDD1,HDD2
...
<Connection>
P01: connected to FCSw01.P09
<Configuration>
LUN1: HDD1+HDD2 with RAID1
...

Fig. 29

METHOD, APPARATUS AND SYSTEM FOR DISPLAYING RESULT OF FAILURE ROOT CAUSE ANALYSIS

TECHNICAL FIELD

The present invention relates to a computer system that comprises a server computer, a network apparatus and/or a storage subsystem, as well as a management system for managing this computer system, and a computer system that comprises this computer system and this management system.

BACKGROUND ART

The coupling together of various information processing apparatuses by way of computer networks (hereinafter, referred to simply as networks) has resulted in much larger, more complex computer systems in recent years, and in line with this, a failure occurring in any of the information processing apparatuses has come to affect various information processing apparatuses on the network. As root cause analysis technique for identifying the locations and causes of these failures there is event correlation technique, which utilizes event information denoting the symptom of a failure notified from the information processing apparatus to analyze the failure location and cause (For example, Patent Literature 1). Because event correlation technique uses correlation with the event information notified at the time of the failure to infer the root cause, this technique has been used in diagnosing failures in network system for a long time.

Further, in Non-Patent Literature 2, there is disclosed a technique, which uses an expert system-based inference engine to rapidly determine the root cause of a failure by making rules for pairing up root causes that are inferred from a combination of the event information by this event correlation technique and events at the time of a failure.

CITATION LIST

Patent Literature

[PTL 1]
U.S. Pat. No. 6,249,755

Non Patent Literature

[NPL 1]
"Rete: A Fast Algorithm for the Many Pattern/Many Object Pattern Match Problem," ARTIFICIAL INTELLIGENCE, Vol. 19, No. 1, 1982, pp. 17-37

SUMMARY OF INVENTION

Technical Problem

Event correlation technique is an effective technique for narrowing down the cause candidates of a failure from event combination patterns notified at the time of the failure, but often there are a plurality of cause candidates related to a certain event, and there are cases in which the individually outputted cause candidates of the event combination pattern either do not come into existence simultaneously or are redundant due to the various and sundry information processing apparatuses, the diversification of coupling relationships and the complexity and diversity of the failure patterns. In particular, in a case where the cause of a computer system failure is analyzed using if-then format rules (hereinafter, may also be called the condition-action format) that makes pairs of failure cause candidates with respect to combinations of events, large numbers of rules must be designed and prepared to correspond to the many and varied information processing systems, coupling patterns and failure patterns.

However, in a case where the analysis result outputted at the time of a failure is displayed in rule units, the number of analysis result displays increases when there area large number of rules, thereby increasing the load on the administrator who checks the analysis results.

An object of the present invention is to reduce the load on the administrator using a management system to carry out cause analysis in accordance with a large number of rules.

Solution to Problem

A management system of the present invention comprises at the least a first analysis rule information and a second analysis rule information, acquires a first analysis result and a second analysis result based on the state of a detected information processing apparatus, and aggregates and displays the first analysis result and the second analysis result based on (A) a cause denoted by an analysis result, (B) a status condition of analysis rule information that is the basis of the analysis result, or (C) a detected state.

Advantageous Effects of Invention

According to the present invention, it is possible to reduce the load of the administrator using the management system to carry out cause analysis in accordance with a large number of rules.

BRIEF DESCRIPTION OF DRAWINGS

FIG. 3 is a diagram showing an example of analysis rule information related to an open file system failure in a file server and an example of analysis rule information related to a file system failure in a server.

FIG. 8 is a diagram showing an example of analysis result information corresponding to the analysis rule of FIG. 3.

FIG. 9 is a diagram showing an example of analysis result information corresponding to the analysis rules of FIG. 4 and FIG. 5.

FIG. 10 is a diagram showing an example of analysis result information that differs from that of FIG. 9 corresponding to the analysis rules of FIG. 4 and FIG. 5.

FIG. 11 is a diagram showing an example of analysis result information corresponding to the analysis rules of FIG. 6 and FIG. 7.

FIG. 12 is a diagram showing aggregate analysis result information that is necessary when displaying aggregated analysis results on a screen.

FIG. 13 is a diagram showing a table T2, which stores identification information for analysis result information having the cause apparatus as the key used in apparatus aggregation processing with respect to analysis result information.

FIG. 14 is a diagram showing a table T3, which stores identification information for analysis result information having the cause component as the key used in component aggregation processing with respect to analysis result information.

FIG. 27 is a diagram showing event information.

FIG. 29 is a diagram showing management target composition information.

DESCRIPTION OF EMBODIMENTS

The embodiment of the present invention will be explained below.

In the following explanation, the information in this embodiment will be explained using expressions such as "AAA table", "AAA list", "AAA DB" or "AAA queue", but this information may be expressed using data structures other than the table, list, DB or queue. For this reason, in order to show that the information is not dependent on the data structure, the information may be called "AAA information" with respect to the "AAA table", the "AAA list", the "AAA DB" and the "AAA queue".

Further, when explaining the contents of the respective information, expressions such as "identification information", "identifier", "name", "ID", and "number" will be used but since these expressions are not limited to physical entities, such as an apparatus or component, but rather are allocated for distinguishing between logical entities as well, these expressions are interchangeable.

In the following explanation, there will be instances when "program" is used as the subject of an explanation, but since a prescribed process is carried out by executing a program in accordance with the processor while using a memory and interface, the explanation may also use the processor as the subject. Further, a process that is disclosed having the program as the subject may be a process that a computer, such as a server, and an information processing apparatus perform. Further, either all or a portion of the programs may be realized using dedicated hardware.

Further, various types of programs may be installed in the respective computers using a program delivery server or storage media.

Example 1

1. Composition of Computer System

Figure 1:
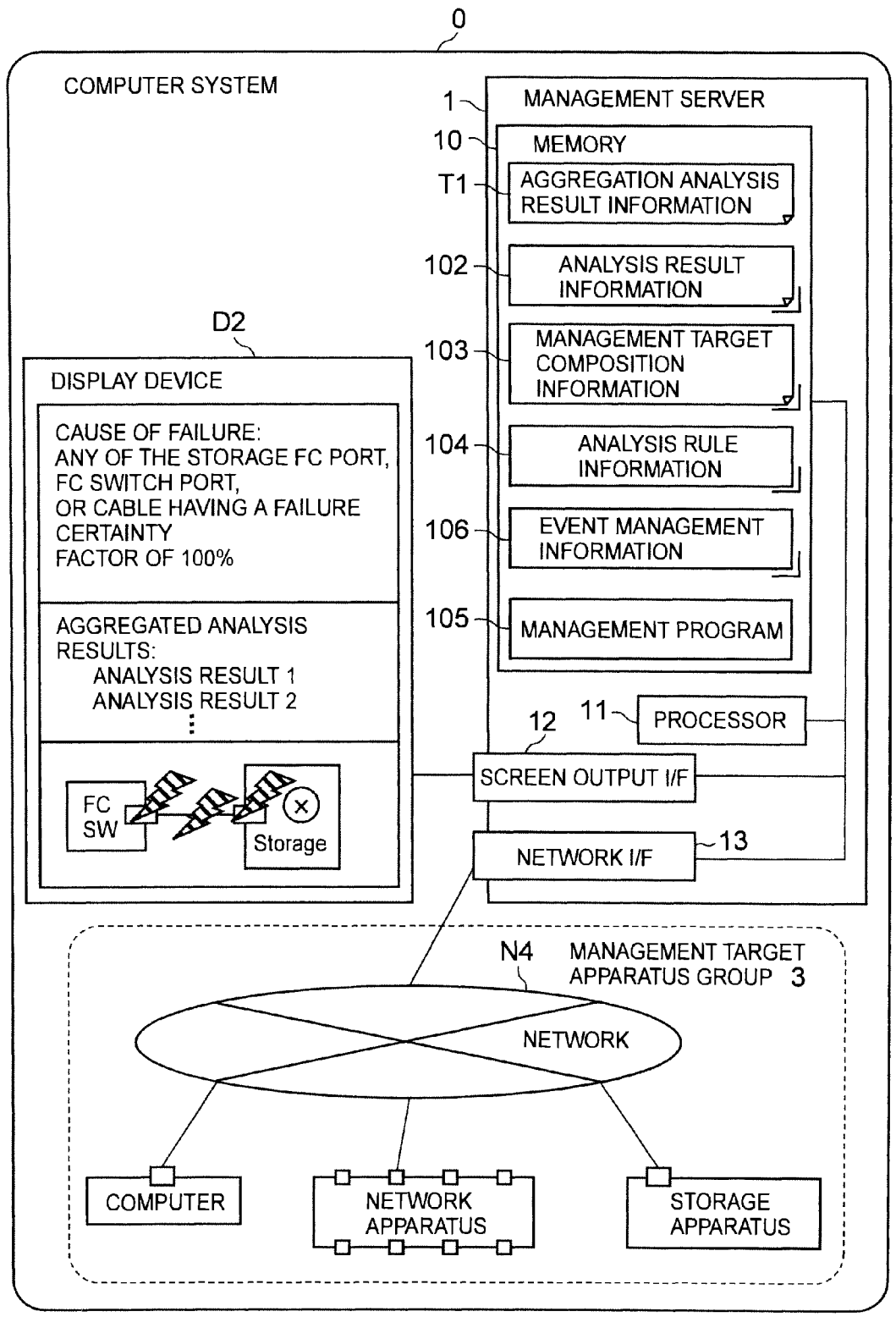
FIG. 1 is a diagram schematically showing an overview of the entire configuration of a computer system.

FIG. 1 is an overview showing one composition of a computer system in accordance with a first aspect of the embodiment of the present invention. The computer system 0 comprises a management server 1, a display device D2 for displaying screen output data created by the management server 1, and a management target apparatus group 3. The management server 1 monitors and manages an information processing apparatus comprising a computer that composes the management target apparatus group 3, a network switch (NW switch), and a storage subsystem as management targets.

The management server 1 comprises a memory 10, which is an area for storing information as electronic data; a processor 11, which utilizes the electronic data residing in the memory 10 to carry out analysis processing of a failure that occurred on a computer network; a network interface 13 (interface may be abbreviated as I/F) for sending and receiving the electronic data to and from the management target apparatus group 3 via a computer network N3 for management use; and a screen output interface 12 for outputting data for displaying on the display device D2. Furthermore, the network interface may be combined with the screen output interface 12.

The memory 10 may be a semiconductor memory that serves as a main memory, or it may comprise either one or both of a magnetic disk device that serves as an auxiliary memory and an externally-mounted storage subsystem.

The management network N3 does not have to be a network that is limited to a Local Area. The management network N3 may be a network that differs from, or may be a network that is either partially or completely the same as the network for carrying out communications with the information processing apparatuses.

The memory 10 stores management target apparatus information 103 comprising an apparatus name related to the management target apparatus group 3, which is provided in the computer system 0 beforehand by the management server 1, and identification information and authorization information required for carrying out an access over the computer network, and in addition, also stores the following information and programs.

Management target composition information 103 comprising a coupling state in a computer network N4, and logical relation information. Furthermore, the memory 10 is able to store a plurality of this information having different contents.

Analysis rule information 104 for carrying out analysis processing in accordance with the processor 11. Furthermore, the memory 10 is able to store a plurality of this information having different contents.

Analysis result information 102 for storing the result achieved by an analysis process carried out in the processor 11 having analysis rule information 104 as the input. The memory 10 is able to store a plurality of this information having different contents.

A management program 105 for executing the steps of the present invention.

Event management information 106 comprising information regarding either a management target apparatus or an event that has occurred in a management target apparatus. Furthermore, the memory 10 is able to store a plurality of this information having different contents.

Aggregation analysis result information T1 created as a result of the processor 11 executing the management program 105.

Furthermore, the explanations of the above-mentioned information and programs stored in the memory 10 will be better understood below in accordance with flowcharts and information diagrams.

As described above, the management server 1 is coupled to a display device 2, but may also comprise another input/output device. A display, keyboard, and pointer device are possible examples of the input-output device, but a device other than these may also be used. Further, instead of an input/output device, a serial interface or an Ethernet interface may be used as an input/output device and this interface may be coupled to a display computer comprising a display, a keyboard, or a pointer device, and may replace the input and display of the input-output device by sending display information to the display computer and receiving input information from the display computer, and by carrying out a display on the display computer and receiving input. Naturally, the management server 1 may also be equipped with a display device.

Below, a set of one or more computers, which manage the management target apparatus group 3 and display the display information of the invention of this application may be called a management system. In a case where the management server 1 displays the display information, the management server 1 is a management system, and a combination of the management server 1 and the display computer is also a management system. Further, to increase the speed and enhance the reliability of management processing, the same processing as that of the management server 1 may be realized in accordance with a plurality of computers, and in accordance with this, this plurality of computers (including the display computer in a case where the display computer carries out the display) is a management system.

<1.1. Definition of Terms>

Definitions of the terminology used in the present invention will be described below. Furthermore, definitions of terms will also be provided in other places in this specification.

Information processing apparatus: Refers to an apparatus for either sending or receiving a network communication (for example, a server apparatus, a storage subsystem, a printer, a scanner, a personal computer, a PDA, or a mobile telephone), and an apparatus for relaying a network communication (a router, a proxy server, or a switch). Furthermore, a server apparatus, for example, may be a Web server, a file server, a name server, a directory server, or an authentication server, but any apparatus that provides some sort of service may also be used.

Monitoring target information processing apparatus: An information processing apparatus that the management server 1 targets for monitoring.

Certainty factor: A value representing the likelihood that a certain symptom has occurred.

2. Information of Computer System or Management Server

The various types of information of the management server 1 will be explained.

<2.1. Management Target Apparatus Information>

The management target composition information 103 comprises an identifier of the management target apparatus that the management server 1 targets for management, and the physical and logical relations between apparatuses (for example, the coupling relation, the server/client relation, and the inclusive relation). The above-mentioned identifier may be an identifier for communicating with the management target apparatus, for example, an IP address, FQDN (Fully Qualified Domain Name) or a host name. However, an identifier other than these may used as long as communication with the management target apparatus is ultimately possible.

Figure 28:
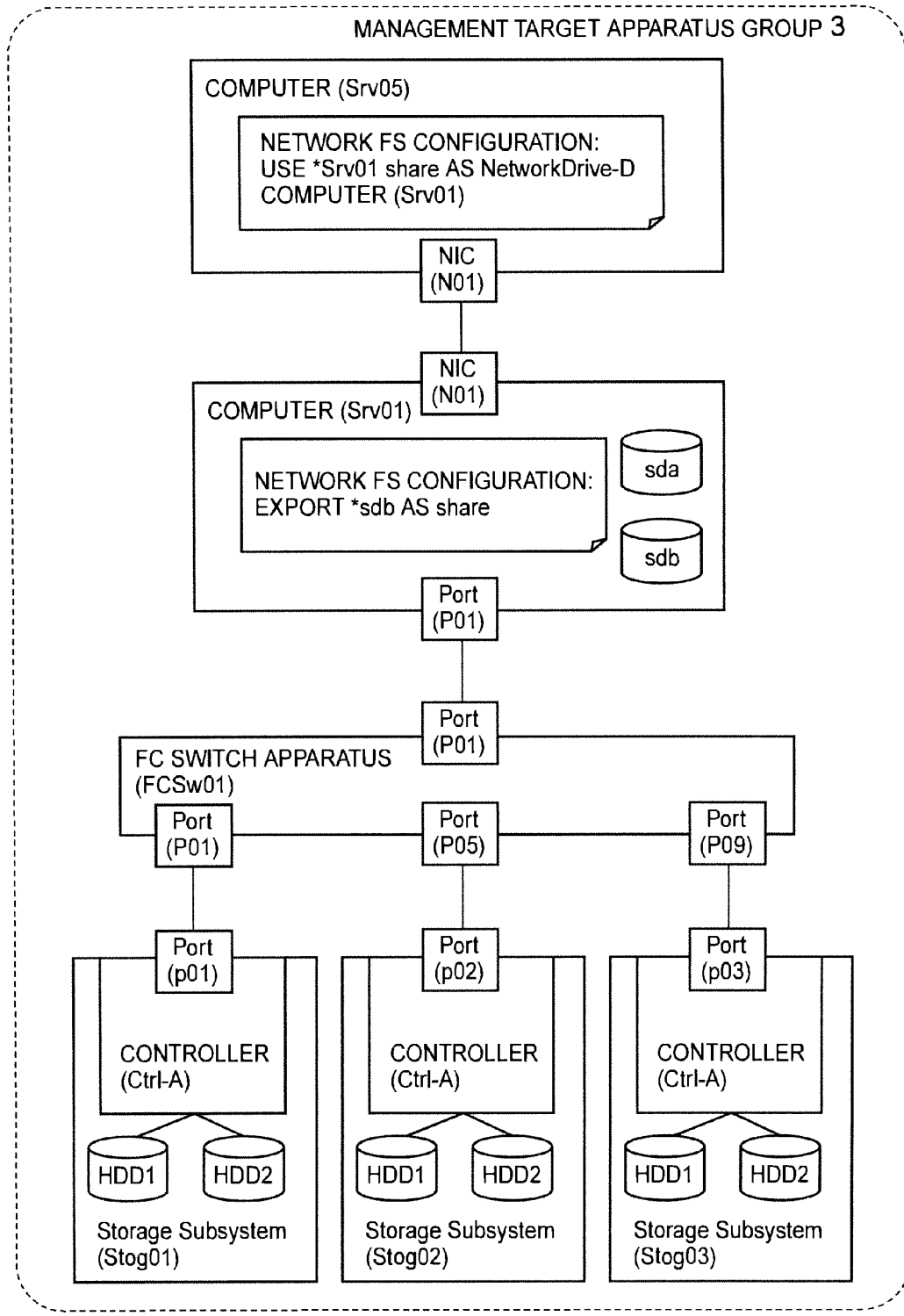
FIG. 28 is a diagram showing an example of a management target apparatus group.

FIG. 29 is an example of management target composition information 103 created with respect to the example of the management target apparatus group 3 shown in FIG. 28. Furthermore, FIG. 29 and FIG. 30 are examples, and do not limit the scope of rights of this application. In the example of FIG. 29, the following information is stored in this information for the respective monitoring target information processing apparatuses. Furthermore, not all of the following items are necessary.

The type of monitoring target information processing apparatus (for example, a storage subsystem, a switching apparatus, a server apparatus, or the like) and the type of components that compose this apparatus.

Information of the components that compose the monitoring target information processing apparatus, and the inclusive relation either between the apparatus and a component, or between a component and a component.

The coupling partner component of a component for carrying out network communications.

The configuration of the monitoring target information processing apparatus.

Furthermore, the management target composition information 103 may be either created or updated in accordance with the following processes, but may also be created from another process.

The management program 105 either creates or updates the management target composition information 103 based on the composition information and configuration information for each apparatus received from the monitoring target information processing apparatus.

In a case where the management program 105 is able to carry out the configuration of the monitoring target information processing apparatus, the management program configures the apparatus configuration information received via the input device of the management server in the apparatus, and, in addition, either creates or updates the management target composition information 103.

<2.2. Event Management Information>

FIG. 27 shows the event management information 106. The event management information comprises the following information.

Event ID: This is information for identifying the event management information.

Event detection time: Denotes the time at which the event was detected. Furthermore, there are cases where event detection is in the monitoring target information processing apparatus, and other cases where it is in the management system, and a value based on a timer respectively managed by either the computer or the apparatus is set in this time.

Source apparatus ID: Stores the identifier of the apparatus in which the event occurred.

Source component ID: Stores the identifier of the component inside the apparatus that is the reason for the event.

Status. Stores the status of the source component that was changed by the event occurrence.

Furthermore, the event management information 106 may comprise other information beside this, and the above-mentioned value may be changed to an indirect value by storing indirect information. This, for example, involves inputting a clear message stating a resultant specific status, such as "FC Port power down detected" instead of "status".

Furthermore, the event management information 106 is created by the processing of the management program 105 in accordance with receiving event-related information (hereinafter, called event reception information), which the monitoring target information processing apparatus creates in response to an event detection and sends to the management system.

<2.3. Analysis Rule Information>

Figure 2:
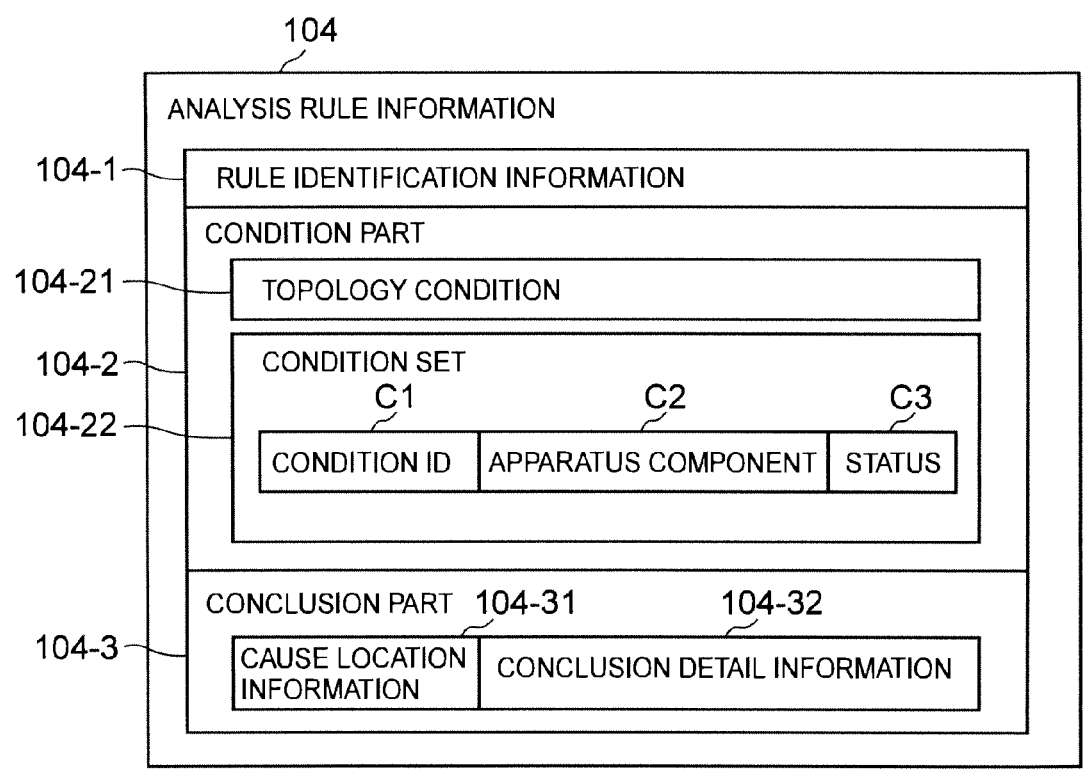
FIG. 2 is a diagram showing analysis rule information utilized when using a processor to carry out failure analysis.

FIG. 2 is a diagram showing the analysis rule information 104.

The analysis rule information 104 comprises the following information.

Identification information 104-1, which uniquely identifies the analysis rule.

A topology condition 104-21, which denotes the relation between the apparatus that is targeted for analysis rule application and its components.

A condition set 104-22, which is a set of conditions for identifying a so-called cause location that is composed from one or more events (preferably an event that is able to either directly or indirectly show the state of either the apparatus or the component) that must be detected in order to identify the cause location of a failure that has occurred in the management target apparatus group 3. Furthermore, the above-described topology condition 104-21 and condition set 104-22 may collectively be called the condition part 104-2.

A conclusion part 104-3 made up of cause location information 104-31, which shows the cause location of the failure, and conclusion detail information 104-32, which is detailed information on the conclusion with respect to the failure cause as the conclusion of the if-then format rule.

Furthermore, the individual conditions that compose the condition set 104-22 comprise a condition ID C1, which is the ID for further identifying the condition inside the rule, an apparatus component C2 denoting the component of the apparatus in which the event occurred, and a status C3 denoting the state of this apparatus component. Furthermore, the condition ID C1 is not essential.

<2.3.1. Example of Analysis Rule Information>

In order to explain the present invention, an example of a general rule will be explained using the apparatus group of FIG. 28 as an example.

The analysis rule information 104-R1 of FIG. 3 is an example of the analysis rule information in the following case. This information, in which the rule identification information is identified as "R1", will be assumed to have the following topology.

The local file system of a file server computer (hereinafter, abbreviated as file server) is exported to another computer on the network. Furthermore, there are cases in which the entire file system is targeted for export, and other cases in which a portion of the file system is targeted for export.

The above-mentioned other computer uses the above-mentioned file system exported via the network as a network drive. Furthermore, network drive is an expression peculiar to Microsoft Windows (registered trademark), and a network drive is not necessarily essential for utilizing the exported file system.

In a case where the above topology is assumed, a specification to the effect "file server and client computer using file server-exported file system" is made in the condition part as the topology condition. The following is further specified in the condition part as the condition set.

As condition R1-21, the status of the file server-exported file system becomes error.

As condition R1-22, the status of the client machine network drive becomes error.

Furthermore, in addition to the error status comprising the fact that at the least either the apparatus or the component is unable to be used, this error status may also comprise a general error status. For the other cases explained hereinbelow as well, unless otherwise stated, it will be supposed that the error status has the above-described meaning.

The conclusion part specifies the following for this condition set.

The cause location information is the "file server"-exported file system.

The detailed message is "cause is failure of file server-exported file system".

The following is specified in the analysis rule information 104-R2 of FIG. 3 as an example of an analysis rule for handling a failure in the server file system.

In rule identification information R2-1, since a topology condition of "none" is set in the condition part as the application-destination topology, "R2" is applied at the least to all the management-targeted file servers.

The condition that makes up the condition part specifies the status of the "computer file system" as error. Then, the following is specified in conclusion part R2-3 as the conclusion corresponding to this condition set.

The cause location information is the "computer file system".

The detailed message is "cause is failure of computer file system".

Figure 4:
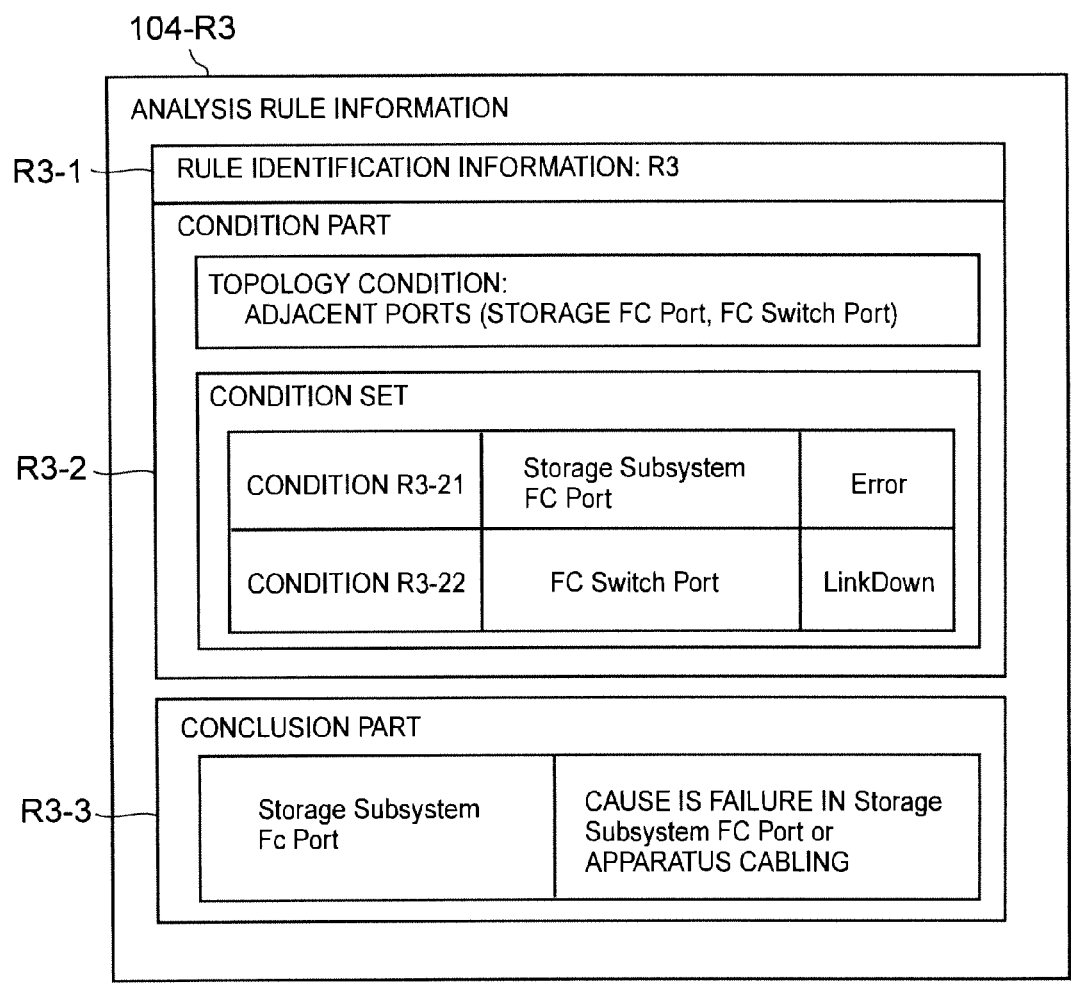
FIG. 4 is a diagram showing an example of an analysis rule related to a failure in a storage subsystem FC port in the topology of an FC switch adjacently coupled to the FC port of the storage subsystem.
Figure 5:
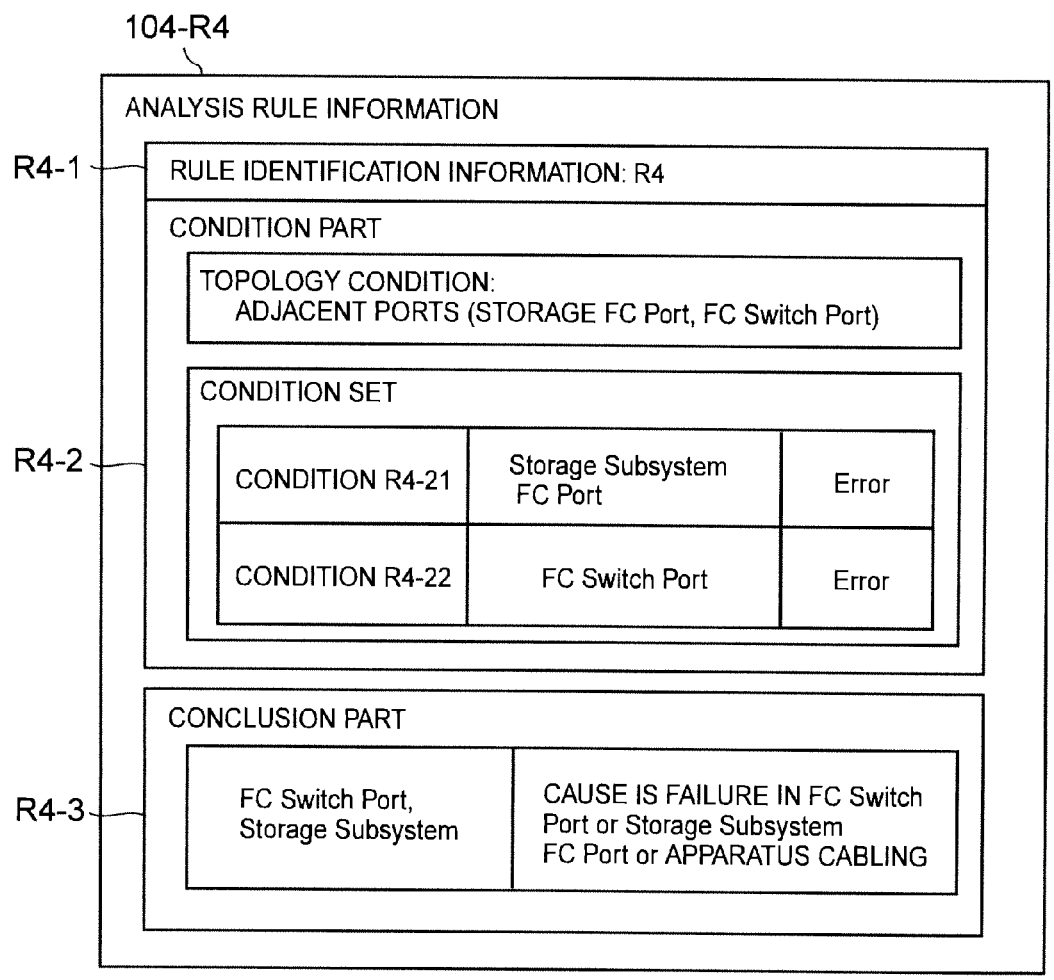
FIG. 5 is a diagram showing an example of an analysis rule related to a failure in an FC switch port in the topology of the FC switch adjacently coupled to the FC port of the storage subsystem.

The analysis rule information 104-R3 of FIG. 4 and the analysis rule information 104-R4 of FIG. 5 are examples of analysis rules related to a storage sub-system and a FC switch that is directly coupled to this storage sub-system via a cable. Furthermore, the above-mentioned directly coupled signifies that the FC switch is not coupled by way of another FC switch.

For this reason, in both 104-R3 and 104-R4, "adjacent ports: storage sub-system FC port and FC switch port" is specified as the application-destination topology in the condition part.

The condition set of the analysis rule information 104-R3 is composed of two conditions: as condition R3-21, the fact that the status of the storage subsystem FC port is "error"; and as condition R3-22, the fact that the status of the FC switch FC port has changed to "link down". Furthermore, the link down status of the port is a normal status for this port itself, but signifies a state in which communication with the coupling-destination apparatus (the storage subsystem in this case) is not available.

As the conclusion in this case, the "FC port" of the "storage subsystem" is specified as the cause location information in the conclusion part R3-3, and the detailed message specifies that "cause is failure in either one or both of the storage subsystem FC port or the inter-apparatus cable".

The condition set of the analysis rule information 104-R4 disclosed in FIG. 5 is composed of two conditions: as condition R4-21, the fact that the status of the storage subsystem FC port has changed to "error"; and as condition R4-22, the fact that the status of the FC switch port has changed to "error".

As the conclusion in this case, the "port" of the "FC switch" is specified as the cause location information in the conclusion part R4-3, and the detailed message specifies that "cause is failure in at least any one of the FC switch port, the storage subsystem FC port, or the cable".

Figure 6:
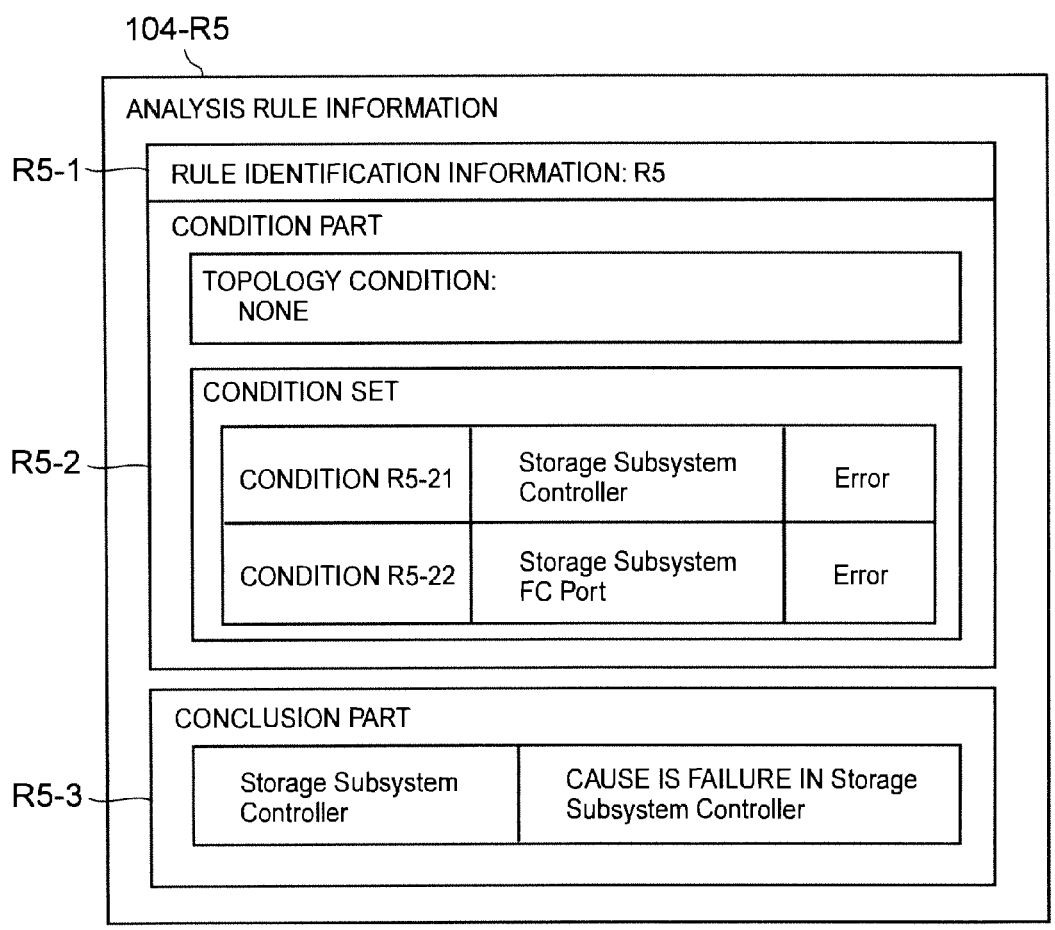
FIG. 6 is a diagram showing an example of an analysis rule related to a failure in the controller of the storage subsystem.

Analysis rule information 104-R5 of FIG. 6 is an example of an analysis rule related to a failure of the storage subsystem controller. The topology condition of the condition part is "none", thereby denoting that this analysis rule information 104-R5 applies to all storage subsystems. The condition set is composed of two conditions: as condition R5-1, the fact that the status of the storage subsystem controller has changed to "error"; and as condition R5-2, the fact that the status of the FC port attached to the storage subsystem controller has changed to "error". As the conclusion in this case, the "controller" of the "storage subsystem" is specified as the cause location information in the conclusion R5-3, and the detailed message specifies that "cause is failure in storage subsystem controller".

Figure 7:
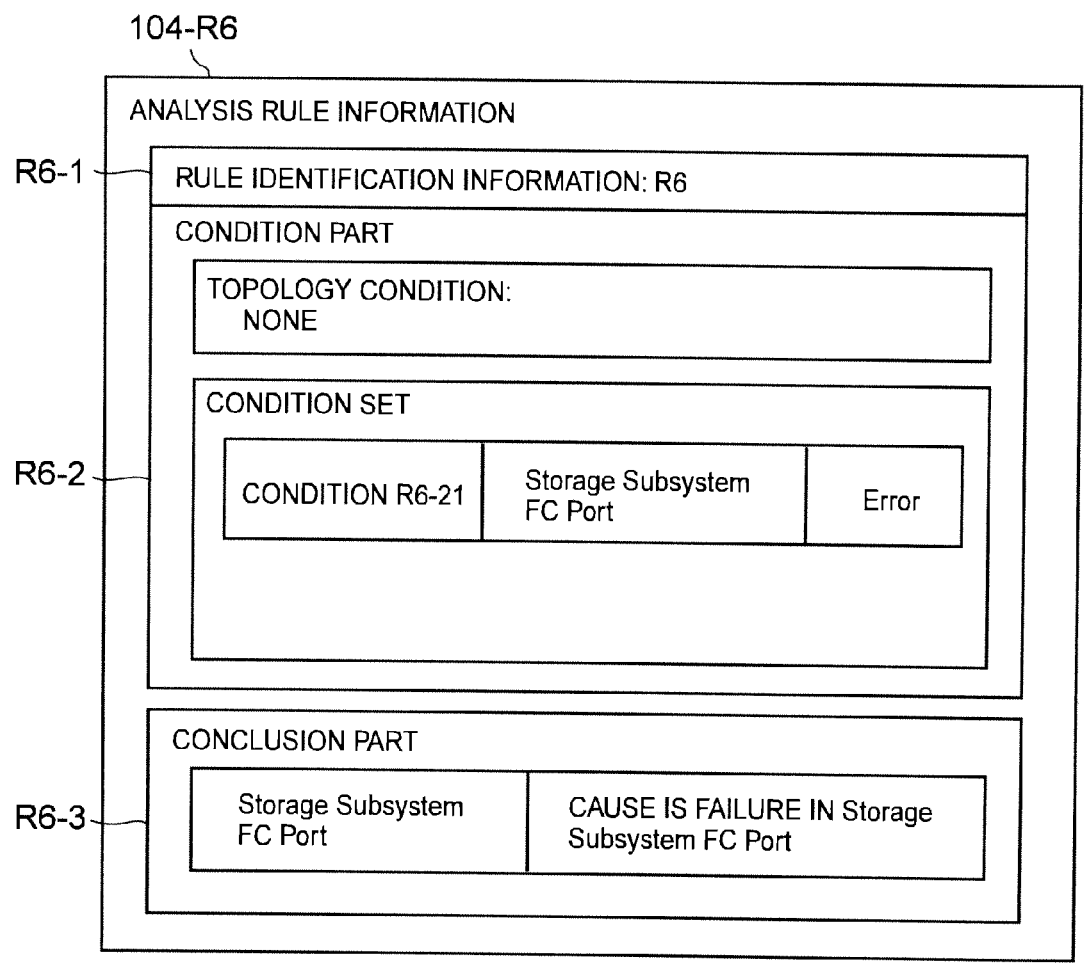
FIG. 7 is a diagram showing an example of an analysis rule related to a failure in the FC port of the storage subsystem.

Analysis rule information 104-R6 of FIG. 7 is an example of an analysis rule related to a failure of the storage subsystem FC port. The topology condition of the condition part is "none", thereby denoting that this analysis rule information 104-R5 applies to all storage subsystems. The condition set is composed of one condition: as condition R6-1, the fact that the status of the FC port attached to the storage subsystem controller has changed to "error". As the conclusion in this case, the "FC port" of the "storage subsystem" is specified as the cause location information in the conclusion R6-3, and the detailed message specifies that "failure of FC port of storage subsystem is the cause".

The preceding has been analysis rules prepared for the purpose of explaining the processing of this example.

<2.4. Analysis Result Information>

Figure 26:
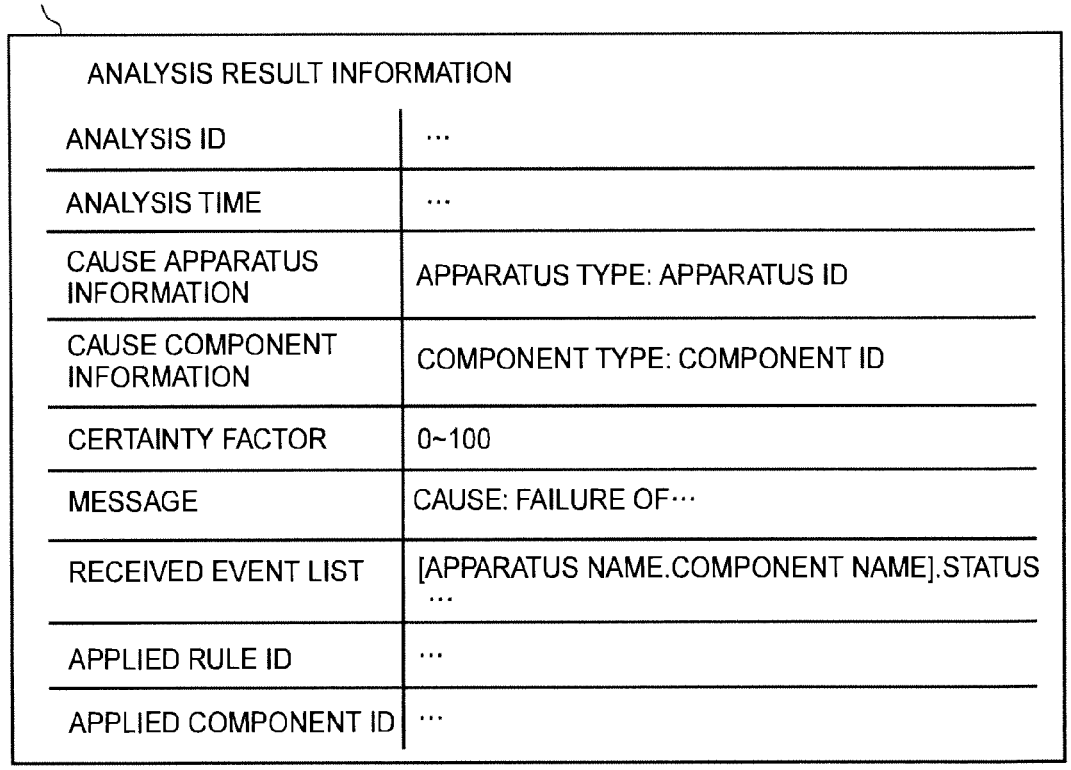
FIG. 26 is a diagram showing analysis result information.

FIG. 26 is a diagram showing analysis result information 102. The analysis result information 102 is created based on the analysis rule information 104 and either the composition or configuration of a set of one or more monitoring target information processing apparatuses that conform to the topology condition, or a rule that has been specifically deployed in accordance with the topology condition. The analysis result information 102 comprises the following information.

Analysis ID: This is an identifier for identifying analysis result information.

Analysis time: This is the time at which an analysis result stored in the analysis result information was obtained.

Applied rule ID: This is the identifier of the analysis rule ID that was used to obtain the analysis result.

Applied component ID: This is one or more identifiers for either one or more monitoring target information processing apparatuses or the components of these apparatuses that applied the analysis rule information identified by the applied rule ID.

Cause apparatus information: This is the type and identifier of the monitoring target information processing apparatus, which is the cause of a chain of events, obtained by applying the analysis rule information identified by the applied rule ID to either the monitoring target information processing apparatus or a component of this apparatus specified by the applied component ID. Furthermore, the type may be omitted in this row.

Cause component information: This is the type and identifier of the component of the monitoring target information processing apparatus, which is the cause of a chain of events, obtained by applying the analysis rule information identified by the applied rule ID to either the monitoring target information processing apparatus or a component of this apparatus specified by the applied component ID. Furthermore, the type may be omitted in this row.

Received event list: This is information related to one or more events that are the basis for deriving the cause shown in this analysis result information. Furthermore, information related to individual events comprises either the identifier of the monitoring target information processing apparatus that is the source of the event, or an identifier, which adds the identifier of a component to this apparatus identifier, and the status of either this apparatus or component.

Certainty factor: Specifies the likelihood from one or more events included in the received event list that cause apparatus information and/or a cause apparatus component is the cause location. Furthermore, in this example, the certainty factor takes a value from 0 to 100, with 100 signifying that the above-mentioned cause apparatus information and component from the event information obtained by the management server are certainly the cause location, and a smaller the value signifies a lower certainty. Furthermore, as a matter of course, the certainty may also be expressed used a different expression.

Message: A message for displaying the cause apparatus and the root cause component obtained by applying the analysis rule information identified by the applied rule ID to either the monitoring target information processing apparatus or a component of this apparatus specified by the applied component ID.

Furthermore, the analysis result information 102 is created in accordance with the management program 105 carrying out the following processing.

(Step A) The management program 105 selects a monitoring target information processing apparatus that conforms to the condition part topology condition of the analysis rule information by referencing the analysis rule information 104 and the management target composition information 103. Furthermore, in a case where the topology condition denotes a relation of a plurality of monitoring target information processing apparatuses, a plurality of sets of apparatuses conforming to the topology condition may be selected (For example, in a case where a server apparatus that uses a storage subsystem is used as the topology condition, and there are a plurality of storage subsystems and server apparatuses, a plurality of sets of storage subsystems and server apparatuses are selected.).

(Step B) As processing with respect to the individual sets selected in Step A, the management program 105 references the event management information 106 and selects an event generated by the above-mentioned apparatus set that satisfies the condition of the analysis rule information 104 condition set.

(Step C) In a case where more than one event was selected in Step B, the management program 105 creates analysis result information 102 based on the selection result of Step B. Furthermore, the value of each item of the analysis result information 102 is created as follows.

Received event list: Stores a source apparatus ID, a source component ID and a status for each event selected in Step B. Furthermore, the received event list may also store the event ID of the event management information together with the above-mentioned value as the information identifying the event.

Applied rule ID: Stores rule identification information stored in the analysis rule information used in the Step A selection.

Applied component ID: Stores the identifiers of the apparatus and component disclosed in the cause location information of the analysis rule information 104 condition part, which are the apparatus set selected in Step A.

Cause apparatus information and cause component information: Stores the identifiers of the apparatus and component disclosed in the cause location information of the analysis rule information 104 condition part, which are the apparatus set selected in Step A.

Message: A text that adds the information of the cause apparatus information and the cause component information to the conclusion detail information 104-32 text stored in the analysis rule information used in the Step A selection. Furthermore, the items may be information in a format other than a text format.

Certainty factor: Stores information stored in the received event list of the analysis result information 102 and a certainty factor computed based on the condition of the condition set of the analysis rule information 104. As an example of the computation method, there is a method that multiplies 100 by the value obtained by dividing the number of events shown in the received event list by the number of conditions of the above-mentioned condition set. However, the computation may be made using a different method.

(Step D) The management program 105 stores the analysis result information 102 created in Step C in the memory.

Furthermore, the above-mentioned management program processing may be repeatedly executed autonomously by the management program, may be executed in accordance with an instruction from the administrator, or may serve as a trigger for creating/updating either the event management information or the analysis rule information.

<2.4.1. Examples of Analysis Result Information>

FIGS. 8 through 11 show examples of analysis result information 102.

The analysis result information 102-1 of FIG. 8 is analysis result information for a Server Srv01, which is the file server of the analysis rule information R1, and denotes that an event has been received with respect to the two conditions of the condition set configured in R1. This analysis result information shows that the cause apparatus is the file server Srv01, that the cause component is the File System "/dev/sdb", and that the certainty factor with respect to this result is 50% (This is because the condition set of the R1 analysis rule is composed of two conditions, but only one event has been received at the point in time that the analysis result information 102-1 was created.).

The analysis result information 102-2 of FIG. 8 is analysis result information for the Server Srv01f analysis rule information R2, and shows that an event has been received with respect to one condition of the condition set configured in R2. This analysis result information shows that the cause apparatus is the Server Srv01, that the cause component is the File System "/dev/sdb", and that the certainty factor with respect to this result is 100%.

The analysis result information 102-3 of FIG. 9 is analysis result information for a storage subsystem Stg01 of the analysis rule information R3, and denotes that an event has been received with respect to one condition of the two conditions of the condition set configured in R3. This analysis result information shows that the cause apparatus is the storage subsystem Stg01, that the cause component is port P01, which composes the FC port Ctrl-A, and that the certainty factor with respect to this result is 50%.

The analysis result information 102-4 of FIG. 9 is analysis result information for the port P01 of FC switch FCSw01 of analysis rule information R4, and shows that an event has been received with respect to one condition of the two conditions of the condition set configured in R4. This analysis result information shows that the cause apparatus is either the FC switch FCSw01 or the storage subsystem Stg01, that the cause component is either the port P01 of the FC switch FCSw01 or the FC port P01 of the storage subsystem Stg01 controller Ctrl-A, and that the certainty factor with respect to this result is 50%.

The analysis result information 102-5 of FIG. 10 is analysis result information for a storage subsystem Stg02 of analysis rule information R3, and denotes that an event has been received with respect to the two conditions of the condition set configured in R3. This analysis result information shows that the cause apparatus is the storage subsystem Stg02, that the cause component is FC port P02 of Ctrl-A, and that the certainty factor with respect to this result is 100%.

The analysis result information 102-6 of FIG. 10 is analysis result information for the port P05 of FC switch FCSw01 of analysis rule information R4, and shows that an event has been received with respect to one condition of the two conditions of the condition set configured in R4. This analysis result information shows that the cause apparatus is either the FC switch FCSw01 or the storage subsystem Stg02, that the cause component is either the port P05 of the FC switch FCSw01 or the FC port P02 of the controller Ctrl-A of the storage subsystem Stg02, and that the certainty factor with respect to this result is 50%.

The analysis result information 102-7 of FIG. 11 is analysis result information for a storage subsystem Stg03 of analysis rule information R5, and shows that an event has been received with respect to the one condition of the condition set configured in R5. This analysis result information shows that the cause apparatus is the storage subsystem Stg03, that the cause component is the FC port P01 of the controller Ctrl-A, and that the certainty factor with respect to this result is 100%.

The analysis result information 102-8 of FIG. 11 is analysis result information for the storage subsystem Stg03 of analysis rule information R6, and shows that an event has been received with respect to the one condition of the condition set configured in R6. This analysis result information shows that the cause apparatus is the storage subsystem Stg03, that the cause component is the FC port P01 of the controller Ctrl-A, and that the certainty factor with respect to this result is 100%.

The preceding has been examples of analysis result information prepared for the purpose of explaining the processing of this example.

<2.5. Aggregation Analysis Result Information>

FIG. 12 shows aggregation analysis result information T1, which is display information for displaying aggregated analysis results on a screen.

The aggregation analysis result information T1 is composed of an aggregation type C4, which is a column for storing as content an aggregation type denoting the method by which aggregation is to be carried out, C5, which is a column for storing a certainty factor with respect to aggregated analysis results, a cause location list C6, which has the cause location as an essential element of the aggregated results, and an analysis information list C7 for storing an identifier for uniquely identifying the original analysis results that have been aggregated. The specific steps for displaying a screen using this information are described in detail in FIG. 24, and will be taken up once again in the explanation of FIG. 24.

Furthermore, the following five aggregation types may be specified in C4:

(A) Apparatus aggregation: Aggregates into one analysis result information showing that the cause apparatus is the same. In the case of this aggregation, the management program 105 collectively displays the received event lists disclosed in each of a plurality of analysis result information, and, in addition, makes it easier for the administrator to understand that numerous events occurred as a result of the same cause apparatus failure by displaying the highest value certainty factor of the plurality of analysis result information targeted for aggregation. Furthermore, in a case where analysis results comprising certainty factors for individual analysis rules is to be displayed, the highest value certainty factor of the plurality of analysis result information targeted for aggregation is employed, and the certainty factors of other analysis result information targeted for aggregation are revised to this high value.

(B) Component aggregation: Aggregates into one analysis result information showing that the cause component is the same. In the case of this aggregation, the management program 105 collectively displays the received event lists disclosed in a plurality of analysis result information, and, in addition, makes it easier for the administrator to understand that numerous events occurred as a result of the same cause apparatus failure by displaying the highest value of the certainty factors of the plurality of analysis result information targeted for aggregation. Furthermore, in a case where analysis results comprising certainty factors for individual analysis rules is to be displayed, the highest value certainty factor of the plurality of analysis result information targeted for aggregation is employed, and the certainty factors of other analysis result information targeted for aggregation are revised to this high value.

(C) Higher-level aggregation: Aggregates into one a plurality of aggregation target analysis result information in a case where the plurality of analysis result information obtained by applying a plurality of analysis rules to a set of the same applied apparatuses and components is made the aggregation target, and the condition that differs among the original plurality of analysis rules is the status of a common prescribed apparatus or component. However, this aggregation is applied in a case where the status of the above-mentioned common prescribed apparatus or component is not obtained by receiving an event. In the case of this aggregation, the management program 105 collectively displays the cause apparatus information, cause component information or message respectively disclosed in the plurality of aggregation target analysis result information, and also displays a value obtained by totaling the respective certainty factors of the plurality of aggregation target analysis result information as the aggregated certainty factor.

(D) Exclusive selection: In a case where the plurality of analysis result information obtained by applying a plurality of analysis rules to a set of the same applied apparatuses and components is made the aggregation target, and the condition that differs among the original plurality of analysis rules is the status of a common prescribed apparatus or component, selects one of a plurality of aggregation target analysis result information and carries out display processing that shows the remaining analysis result information is analysis results that are meaningless from the standpoint of failure monitoring. This aggregation is applied in a case where the status of the above-mentioned common prescribed apparatus or component is obtained by receiving an event, and, in addition, is applied to a component for which it is clear that the instant this status occurs only one status is exclusively possible. Further, analysis result information with a high certainty factor is selected. Furthermore, analysis result information having a higher certainty factor is analysis result information based on the analysis rule that satisfies the condition related to the status of the above-mentioned common prescribed apparatus or component. Furthermore, as the display process for the analysis result information that was not selected in this case, the certainty factor may be set to zero, the display of the analysis results may be restrained, the degree of highlighting at display time may be lowered, and so on.

(E) Inclusive aggregation: For a plurality of analysis rules that are the origins of a plurality of aggregation target analysis result information, aggregates into one the plurality of aggregation target analysis result information in a case where a portion of a plurality of conditions of one arbitrary first analysis rule of the plurality of analysis rules is the same as the condition of the one other analysis rule besides the first analysis rule of the plurality of analysis rules. Furthermore, the post aggregation cause apparatus and certainty factor adopt the value of the analysis result information that has the highest certainty factor of the plurality of aggregation target analysis result information. This adoption process adopts an analysis result information value based on the first analysis rule in a case where an event that consequently satisfies the condition difference between the first analysis rule and the second analysis rule is received, and adopts the value of the analysis result information based on the other analysis rule in a case where such an event is not received.

Furthermore, the scope of the present invention also includes a case in which a value that is smaller than the above-mentioned computation result but higher than the value of the original analysis result information is displayed when the certainty factor becomes higher than the value of the individual analysis result information as a result of the aggregation process.

<2.6 Screen Display Information>

Figure 25:
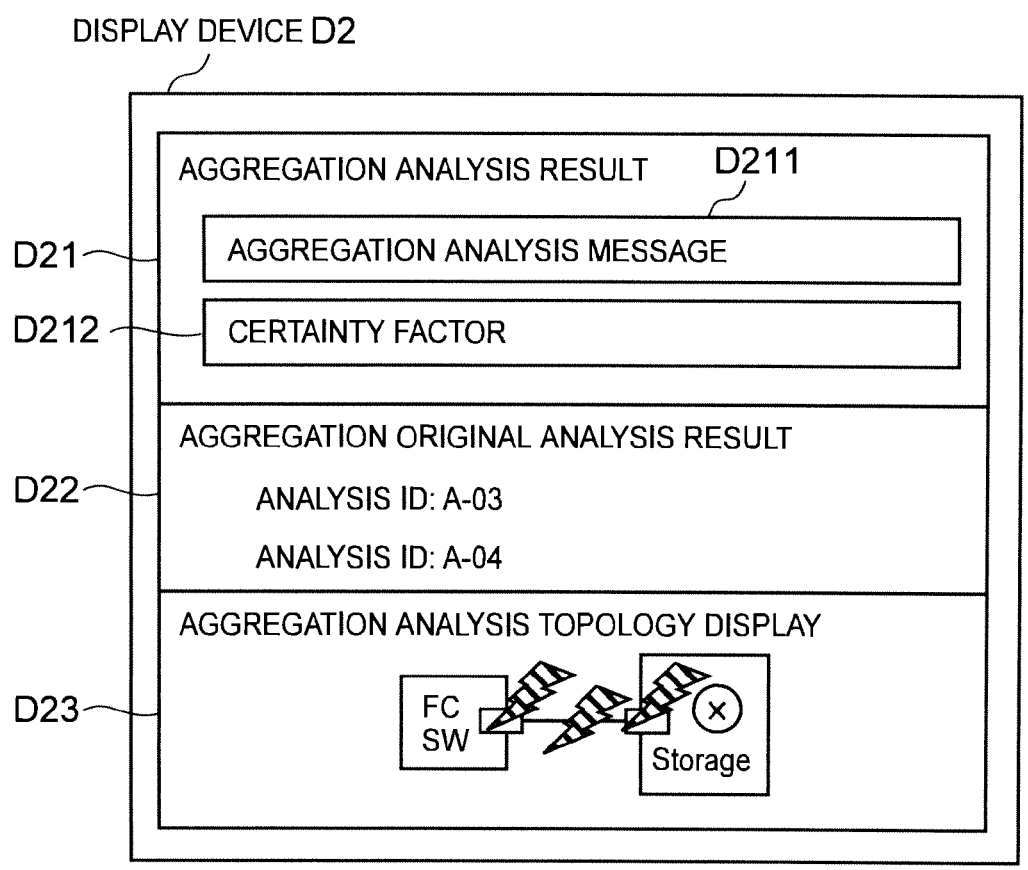
FIG. 25 is a diagram showing an example of the screen display data of the aggregation analysis result.

FIG. 25 shows the composition of screen display data to be displayed on the display device D2. The screen display data is broadly divided into an aggregation analysis result D21, an aggregation original analysis result D22, and an aggregation analysis topology display D23. The aggregation analysis result D21 is an area for displaying a summary of the aggregated analysis results, and displays information related to the cause of the failure as aggregated results. For this reason, an aggregated analysis message D211 comprises an aggregation analysis message that refers to the failure cause location, and a certainty factor D212 showing the likelihood with respect to the aggregation analyzed result. Furthermore, the aggregation original analysis result D22 and the aggregation topology display D23 are not always essential display data. The administrator who manages the IT system will decide whether or not these should be displayed. However, in a case where it is desirable to know the analysis result information, which is the raw data of the aggregated analysis results, a display like that of the aggregation original analysis result D22 is effective.

<2.7. Management Program>

The management program 105 is for managing the status of the monitoring target information processing apparatus. The management program 105, in addition to the processing described up to this point and processing that will be explained below, manages the status of the monitoring target information processing apparatus (for example, statuses related to the presence or absence of a failure, the presence or absence of a configuration change in the relevant apparatus, and performance) and displays same on the display device D2. For this reason, for example, this management program 105 carries out the following.

(A) Receives management information (for example, the presence or absence of a failure, the configuration information for the relevant apparatus, and performance information) from the monitoring target information processing apparatus via the network interface 13.

(B) Determines the above status based on the received management information, and displays same on the display device D2.

Furthermore, the management program 105 may receive a configuration request for the monitoring target information processing apparatus that was received by the management server 1, and may configure the monitoring target information processing apparatus on the basis of this request.

3. Management Server Processes and Displays

Next, the management program 105 of the management server 1 will be explained.

<3.1. Overview of Processing by Management Program>

Processing from when the management server 1 acquires the analysis result information of a certain time period until the analysis results are aggregated, summarized and displayed using the five aggregation methods of (A) apparatus aggregation, (B) component aggregation, (C) higher-level aggregation, (D) exclusive selection, and (E) inclusive aggregation on the analysis result information outputted for each rule will be described below.

Figure 16:
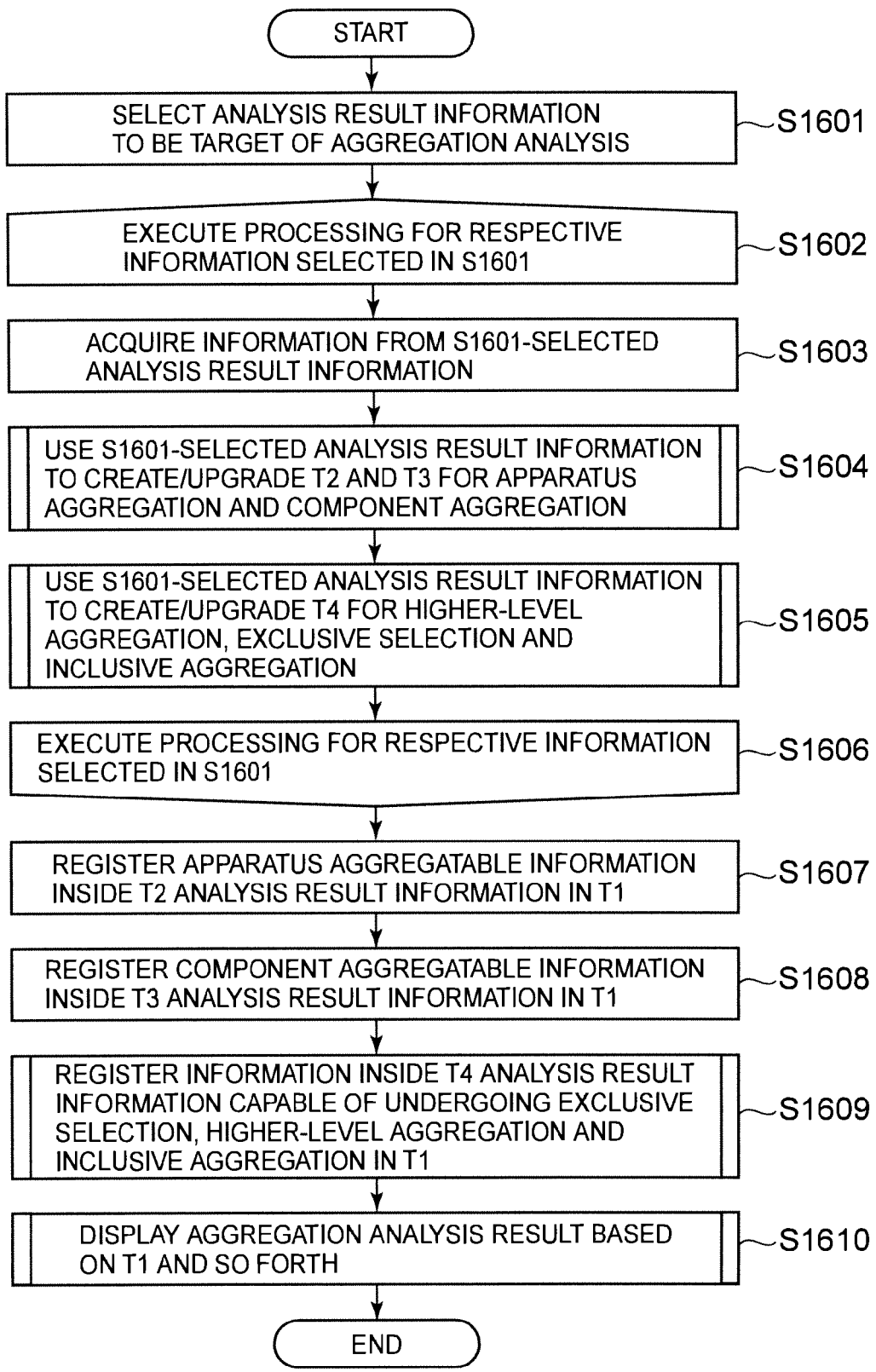
FIG. 16 is a diagram showing the main flow of processing for carrying out various types of aggregation processing based on analysis result information for each analysis rule unit, and for displaying the aggregated analysis results on a screen.

FIG. 16 shows the steps by which the management program 105 executes an aggregation process for analysis result information of a certain time period and displays same on a screen at an arbitrary timing. Furthermore, these steps may also be carried out at a timing specified by the administrator. The processing flow will be explained below.

(Step S1601) The management program 105 selects the analysis result information 102 that is to be the target of aggregation analysis. Furthermore, the selection method, for example, may be one that selects analysis result information that had not been the target of aggregation analysis using this process prior to the previous time, but another method may also be used.

(Step S1602, Step S1606) The management program 105 carries out the processing of Step S3 through Step S5 for each aggregation-analysis-targeted analysis result information 102 selected in Step S1. Furthermore, in the following explanation, one aggregation-analysis-targeted analysis result information 102 selected in Step S1601 will be called the S1601-selected analysis result information.

(Step 1603) The management program 105 acquires the cause apparatus information, component cause information, and an analysis rule ID from the S1601-selected analysis result information.

(Step S1604) The management program 105 registers the S1601-selected analysis information in the table T2, which stores analysis result information related to each apparatus for determining the analysis result information capable of apparatus aggregation. Further, the management program 105 registers the S1601-selected analysis information in the table T3, which stores the analysis result information related to each apparatus and component for determining the analysis result information capable of component aggregation. Furthermore, this processing will be explained in detail further below.

(Step S1605) The management program 105 registers the analysis result information 102 in the table T4 in order to determine the analysis result information 102 that is capable of higher-level aggregation, exclusive aggregation, or inclusive aggregation. This processing will be explained in detail further below.

(Step 1607) The management program 105 registers in the aggregation analysis result information T1 as the apparatus aggregation a row in which two or more pieces of analysis result information of the information recorded in the table T2 are related to the same cause apparatus. The specifics of the registration are as follows.

Aggregation type: Stores a value denoting apparatus aggregation.

Aggregation certainty factor: Stores the highest value of the plurality of analysis result information shown in a related analysis ID list of the relevant row in Step S7.

Cause location list: Stores the cause apparatus information of the relevant row in Step S7.

Analysis result list: Stores a related analysis ID of the relevant row in Step S7.

(Step S1608) The management program 105 registers in the aggregation analysis result information T1 as the component aggregation a row in which two or more pieces of analysis result information of the information recorded in the table T3 are related to the same cause apparatus and cause component. The specifics of the registration are as follows.

Aggregation type: Stores a value denoting component aggregation.

Aggregation certainty factor: Stores the highest value of the plurality of analysis result information shown in a related analysis ID list of the relevant row in Step S8.

Cause location list: Stores the cause apparatus information and the cause component information of the relevant row in Step S8.

Analysis result list: Stores a related analysis ID list of the relevant row in Step S8.

(Step S1609) The management program 105, based on the table T4, creates/updates the aggregation analysis result information T1 with respect to the analysis rule for which the aggregation type exclusive selection, higher-level aggregation or inclusive aggregation is applicable. This processing will be described in detail further below.

(Step S1610) The management program 105, using the aggregation analysis result information T1, the event management information 106, the analysis rule information 104, the management target composition information 103, and the analysis result information 102, renders and outputs the aggregation analysis result to the display device D1. The type of data that will serve as the basis here for displaying the screen composition of the screen display of the aggregation analysis result shown in FIG. 25 will be explained below using screen output processing steps.

Furthermore, aggregation processing may be carried out once again to input the post-aggregation aggregation analysis result anew.

<3.2. Other Management Program-Created Information>

Table T2 through table T4 used in the above-described processing will be explained below.

<3.2.1. Table T2>

FIG. 13 is a diagram showing the table T2. Table T2 stores in a column C202 the identifier of the analysis result information 102 in which the relevant apparatus is the cause apparatus for each cause apparatus disclosed in a cause apparatus column C201. Furthermore, the table T2 may be created while a program is running, and may be deleted subsequent to the aggregation analysis result information T1 being created.

L201, which is given as an example in table T2, is the result of the processing of Step S1604 with respect to the analysis result information 102-1 and 102-2 of FIG. 8, and because the cause apparatus of these pieces of analysis result information is the same "Srv01", "A-01, A-02" are registered in the related analysis ID list as in L201 of FIG. 13.

<3.2.2. Table T3>

FIG. 14 is a diagram showing the table T3. Table T3 stores in a column C303 the identifier of the analysis result information 102 in which the relevant apparatus component is the cause component for each cause apparatus and component disclosed in a cause apparatus/cause component information column C301. Furthermore, the table T2 may be created while a program is running, and may be deleted subsequent to the aggregation analysis result information T1 being created.

L301, which is given as an example in table T3, is the result of the processing of Step S1604 with respect to the analysis result information 102-1 and 102-2 of FIG. 8, and because the cause component of these pieces of analysis result information is the same "Srv01./dev/sdb", "A-01, A-02" are registered in the related analysis ID list as in L301 of FIG. 14.

<3.2.3. Table T4>

Figure 15:
FIG. 15 is a diagram showing a table T4, which stores an analysis ID, an applied condition list corresponding to the analysis ID and a received event list used in the processing of higher-level aggregation, exclusive selection, and inclusive aggregation with respect to analysis result information.

FIG. 15 is a diagram showing the table T4. Table T4 stores a list (applied condition list C402) of events that must be received in order for the analysis result information-disclosed cause to attain a certainty factor of 100, and a list (received event list C403) of events that are used (or received) at the point in time the certainty factor of the analysis result information was computed, for each piece of analysis result information. Furthermore, table T4 may be created while a program is running, and may be deleted subsequent to the aggregation analysis result information T1 being created.

L401, which is given as an example in the table T4, is the result of the processing of Step S1605 with respect to the analysis result information 102-1 of FIG. 8, and, as the applied condition C402, stores "Srv01./dev/sdb.Error, Srv05.NetworkDrive-D.Error" created by applying the condition set of the analysis rule information R1, in which the applied rule ID for the apparatus and component disclosed in the applied component ID of the analysis result information 102-1 is shown, to the apparatus and component disclosed in the applied component ID. Further, as the received event list C403, the table T4 stores "Srv01./dev/sdb.Error", which is the information of the received event list of the analysis result information 102-1.

<3.3.1. Process for Creating Tables T2 and T3>

Figure 17:
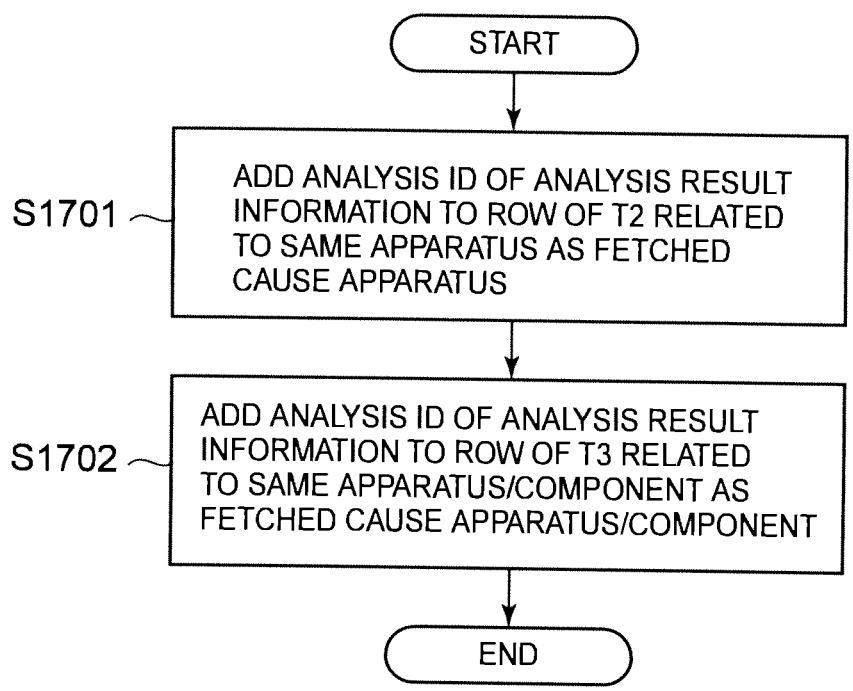
FIG. 17 is a flowchart for creating the table T2 and the table T3.

Next, the process for creating tables T2 and T3 for the apparatus aggregation and the component aggregation will be explained. FIG. 17 is a flowchart showing the details of Step S1604 of FIG. 16.

(Step S1701) The management program 105 searches for the row of table T2 that has the cause apparatus information fetched from the S1601-selected analysis result information acquired in Step S1603 of FIG. 16, and in a case where this row does not exist, creates a row that has the fetched cause apparatus information in column C201. Then, the management program 105 adds the analysis ID of the S1601-selected analysis result information to the row of table T2 that has the fetched cause apparatus information.

(Step S1702) The management program 105 searches for the row of table T3 that has the cause apparatus information and the cause component information fetched from the S1601-selected analysis result information acquired in Step S1603 of FIG. 16, and in a case where this row does not exist, creates a row that has the fetched cause apparatus information in column C301. Then, the management program 105 adds the analysis ID of the S1601-selected analysis result information to the row of table T3 that has the fetched cause apparatus information.

<3.3.2. Process for Creating Table T4>

Figure 18:
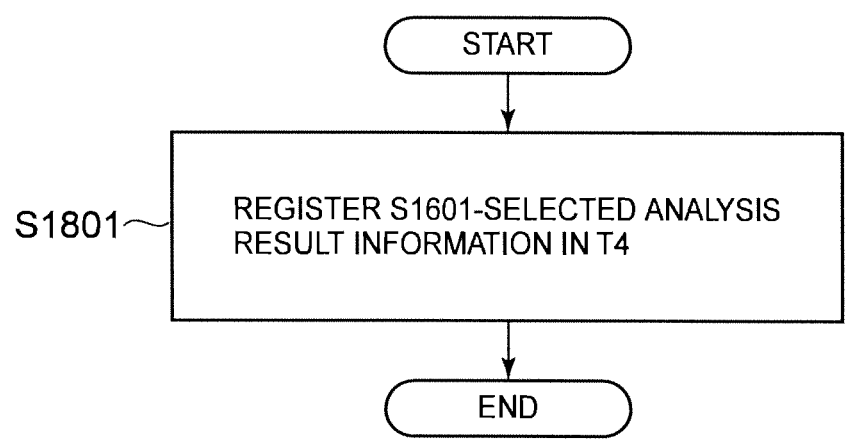
FIG. 18 is a flowchart for creating the table T4.

Next, the process for creating table T4 for higher-level aggregation, exclusive selection, and inclusive aggregation will be explained. FIG. 18 is a flowchart showing the details of Step S1605 of FIG. 16.

(Step S1801) The management program 105 registers the S1601-selected analysis result information acquired in Step S1603 of FIG. 16 in the table T4. More specifically, the respective columns of the table T4 store the following values.

Analysis ID C401: Stores the analysis ID of the S1601-selected analysis result information.

Applied condition list C402: Stores a set of the condition and the monitoring target apparatus and component obtained by applying the condition of the analysis rule information denoted by the applied rule ID to either the monitoring target apparatus or component denoted by the applied component ID of the S1601-selected analysis result information.

Received event list C403: Stores the value of the received event list of the S1601-selected analysis result information.

<3.3.2. Process for Creating the Aggregation Analysis Result Information T1>

Figure 19:
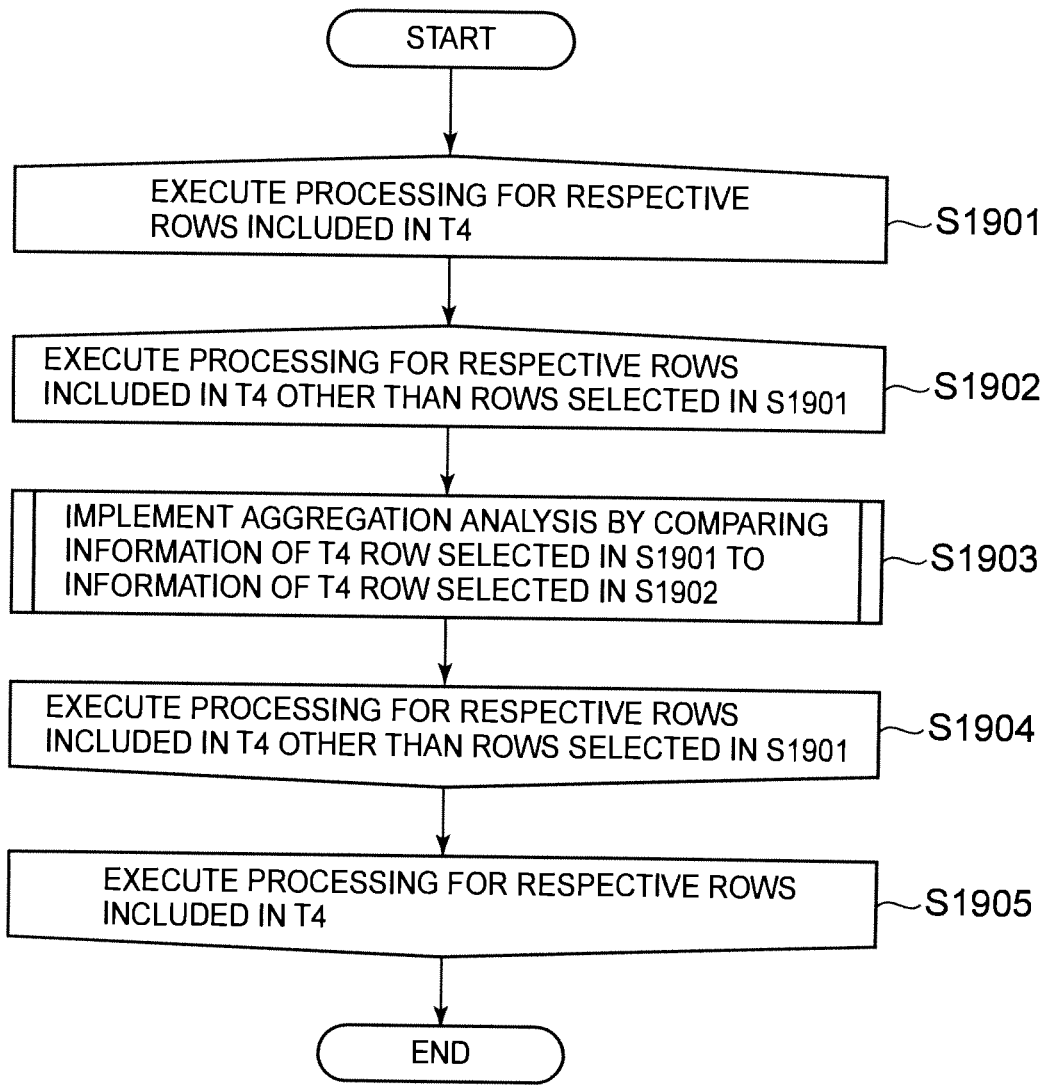
FIG. 19 is a diagram showing the flow of processing for creating the data of FIG. 12 used in the aggregation process for higher-level aggregation, exclusive selection and inclusive aggregation.

FIG. 19, which details the aggregation processing steps of Step S1609 of FIG. 16 with respect to higher-level aggregation, exclusive selection, and inclusive aggregation, will be explained next.

(Step S1901, Step S1905) The management program 105 executes the processing of Step S1902 through Step S1904 by targeting each row included in the table T4 (hereinafter, referred to as the S1901-targeted T4 row).

(Step S1902, Step S1904) The management program 105 executes the processing of Step S1903 by targeting each row included in the table T4 exclusive of the S1901-targeted T4 row (hereinafter, referred to as the S1902-targeted T4 row).

(Step S1903) The management program 105 carries out aggregation analysis based on the S1901-targeted T4 row and the S1902-targeted T4 row.

Figure 20:
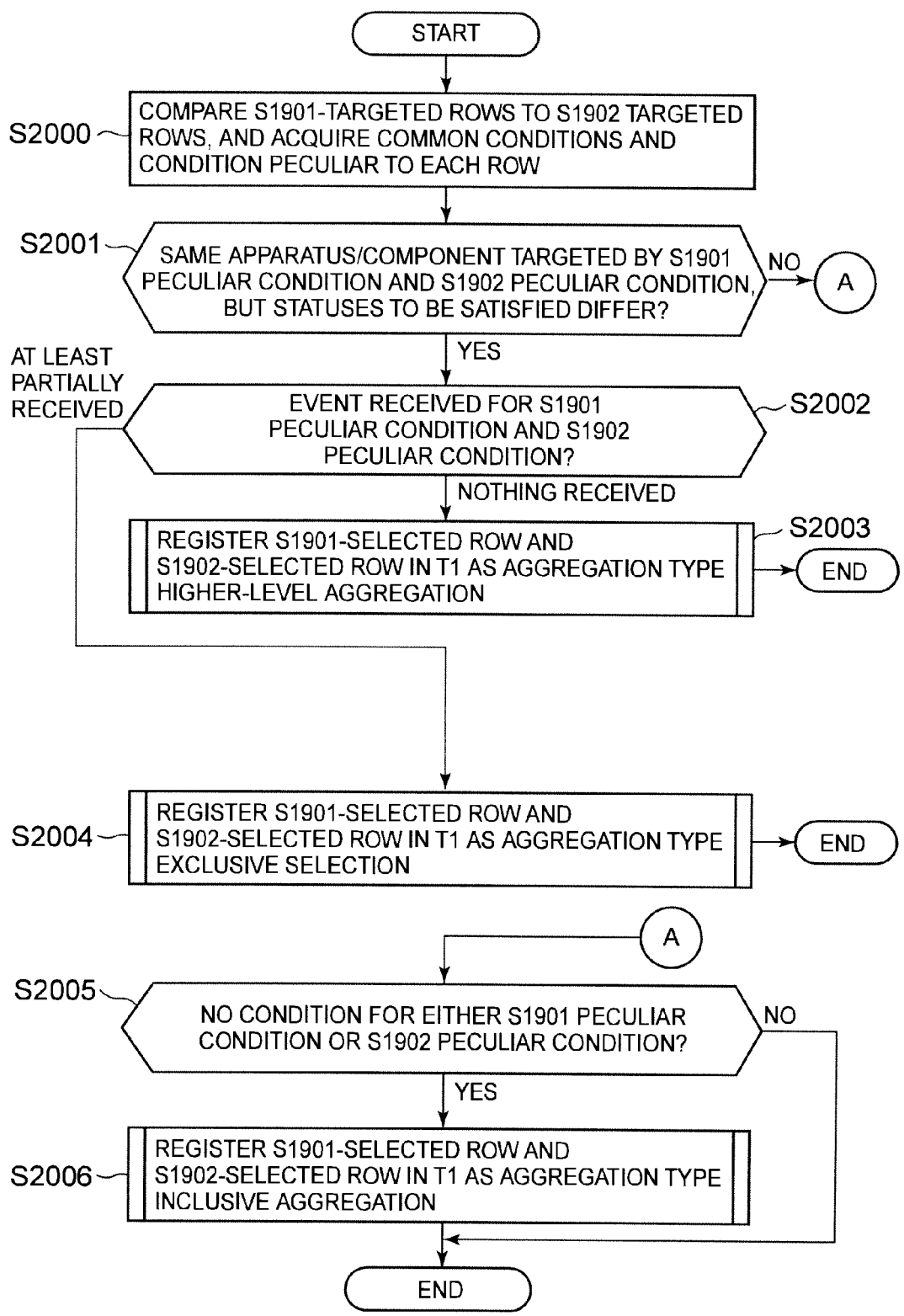
FIG. 20 is a flowchart for creating the aggregation analysis result information T1 based on the table T4.

FIG. 20 is a flowchart showing the details of Step 1903 of FIG. 19.

(Step S2000) The management program 105 obtains a condition that is common to the S1901-targeted T4 row and the S1902-targeted T4 row, a condition that only the S1901-targeted T4 row has (may also be called the condition peculiar to the S1901-targeted T4 row), and a condition that only the S1902-targeted T4 row has (may also be called the condition peculiar to the S1902-targeted T4 row) by comparing the conditions of the applied condition list C402 of the S1901-targeted T4 row with the conditions of the applied condition list C402 of the S1902-targeted T4 row.

(Step S2001) The management program 105 executes Step S2002 in a case where the condition peculiar to the S1901-targeted T4 row and the condition peculiar to the S1902-targeted T4 row are conditions related to the component of the same monitoring target information processing apparatus and only the status conditions differ, and executes Step S2006 when this is not the case.

(Step S2002) The management program 105 executes Step S2004 in a case where even one event related to the condition peculiar to the S1901-targeted T4 row and the condition peculiar to the S1902-targeted T4 row has been received, and executes Step S2003 in a case where no event has been received.

(Step S2003) The management program 105 registers the S1901-targeted T4 row and the S1902-targeted T4 row in the aggregation analysis result information T1 using higher-level aggregation as the aggregation type, and returns to the processing of FIG. 19. This processing will be explained in detail further below.

(Step S2004) The management program 105 registers the S1901-targeted T4 row and the S1902-targeted T4 row in the aggregation analysis result information T1 using exclusive selection as the aggregation type, and returns to the processing of FIG. 19. This processing will be explained in detail further below.

(Step S2005) The management program 105 checks whether either the condition peculiar to the S1901-targeted T4 row or the condition peculiar to the S1902-targeted T4 row is lacking a condition. In other words, this process may also be described as one that checks whether or not all of the conditions in the applied condition list C402 of the one targeted T4 row are included in the conditions in the applied condition list C402 of the other targeted T4 row. In a case where the conditions peculiar to the one targeted T4 row lack a condition, the management program 105 executes Step S2007, and when this is not the case, returns to the processing of FIG. 19.

(Step S2006) The management program 105 registers the S1901-targeted T4 row and the S1902-targeted T4 row in the aggregation analysis result information T1 using inclusive aggregation as the aggregation type, and returns to the processing of FIG. 19. This processing will be explained in detail further below.

Figure 21:
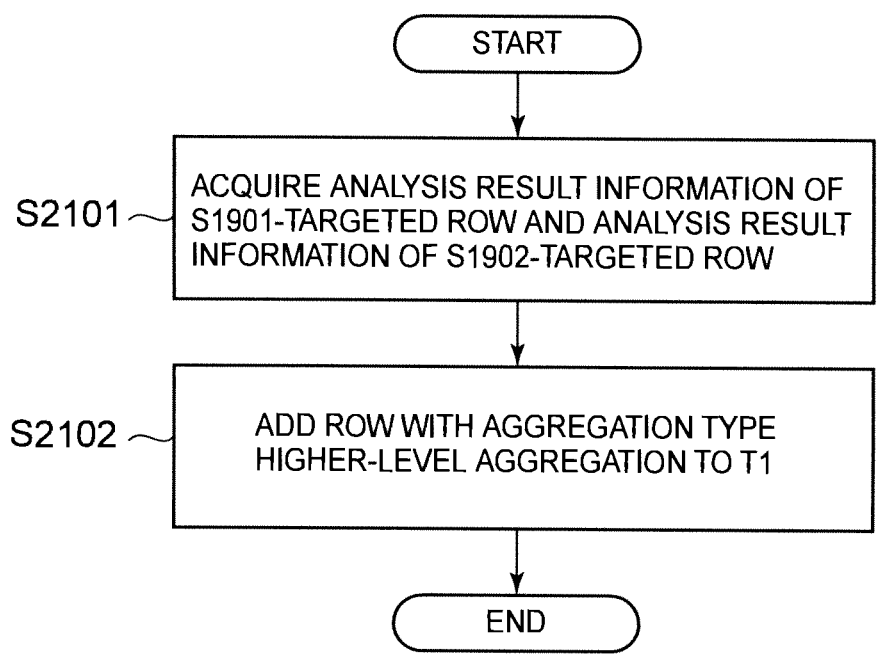
FIG. 21 is a diagram showing the detailed flow of processing in the flowchart of FIG. 20 for higher-level aggregation in particular.

Next, the processing steps of FIG. 21, which details the process for registering data in the T1 with respect to the higher-level aggregation of Step S2003 of FIG. 20, will be explained. An explanation of the processing flow will be given below.

(Step S2101) The management program 105 acquires the respective analysis result information 102 for the analysis ID of the S1901-targeted T4 row and the S1902-targeted T4 row.

(Step S2102) The management program 105 adds the row, in which the aggregation type is higher-level aggregation, to T1 (to make the explanation easier to understand, the row of the aggregation analysis result information T1 will be called the T1 row). The values of the respective columns of the T1 row are as follows.

Aggregation certainty factor: Stores a certainty factor that was assessed solely on the common condition obtained in Step S2000 of FIG. 20.

Cause location list: Stores a list to which has been added information determined subsequent to having respectively determined two pieces of analysis result information 102 that acquired cause location information combining cause apparatus information and cause component information.

Analysis result list: Stores the analysis ID of the S1901-targeted T4 row and the analysis ID of the S1902-targeted T4 row.

The registration of data in the T1 with respect to the higher-level aggregation is completed in accordance with the above Steps.

The examples of analysis result information A-03 and A-04 denote a case in which the "error" and "link down" statuses of the FC switch port, for which only the status portions differ within the condition sets of the analysis rule information R-3, R-4 corresponding to A-03 and A-04, respectively, make it impossible for the management program 105 to receive an event related to the FC switch, which is directly coupled to the storage subsystem "Stg01". Furthermore, a case in which the management program 105 is unable to receive an FC switch-related event may be both a case in which the status of any port of the FC switch is a status other than error or link down, and a case in which an event denoting either an error or a link down is unable to be received in a state in which event reception is not possible due to a communication failure between the FC switch and the management server 1.

The aggregation certainty factor of A-03 and A-04 in the above situation is computed having as the condition only the "error" in the "FC port" of the storage subsystem "Stg01", which has R3 and R4, exclusive of the FC switch-related conditions R3-22 and R4-22, as a common condition. Therefore, the aggregation certainty factor is registered in the aggregation analysis result information T1 as in L103. In accordance with this, the affect of heightening the certainty factor is that the analysis granularity is aggregated into a coarse granularity that aggregates a plurality of rules, but it is possible to collectively display the analysis results for similar causes.

Figure 22:
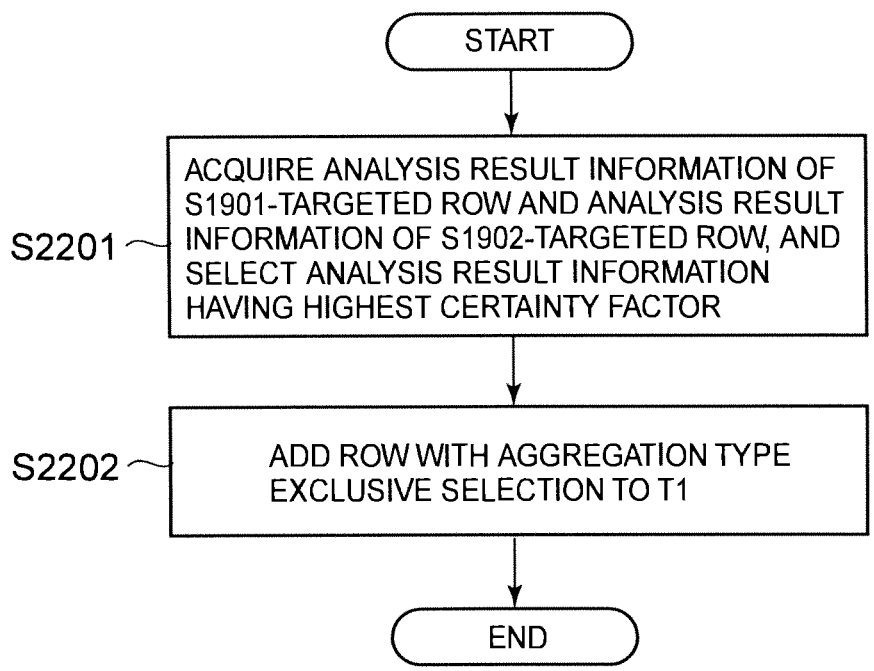
FIG. 22 is a diagram showing the detailed flow of processing in the flowchart of FIG. 20 for exclusive selection in particular.

Next, the processing steps of FIG. 22, which details the process of registering data in the T1 with respect to the exclusive selection in Step S2004 of FIG. 20, will be explained. The processing flow will be explained below.

(Step S2201) The management program 105 acquires the analysis result information 102 from the analysis ID of the S1901-targeted T4 row and the S1902-targeted T4 row. Then, the management program 105 compares the certainty factor of the analysis result information 102 of the S1901-targeted T4 row with the analysis result information 102 of the S1902-targeted T4 row, and selects the analysis result information with the highest certainty factor.

(Step S2202) The management program 105 adds the T1 row that has exclusive selection as the aggregation type to the T1. The values of the respective columns in the added T1 row are as follows.

Aggregation certainty factor: Stores the certainty factor of the analysis result information 102 that had the high certainty factor in Step S2201.

Cause location list: Stores the cause location information that combines the cause apparatus information and the cause component information of the analysis result information 102 that had the high certainty factor in Step S2201.

Analysis result list: First stores the analysis ID of the analysis result information having the high certainty factor, and next stores the analysis ID of either the S1901-targeted T4 row or the S1902-targeted T4 row, whichever did not have the high certainty factor.

The registration of data in the T1 with respect to the exclusive aggregation is completed in accordance with the above Steps.

The examples of analysis result information A-05 and A-06 denote a case in which an event having "link down" as the status of the FC switch port, for which only the status portions differ within the condition sets of the analysis rule information R-3 and R-4 corresponding respectively to A-05 and A-06, has been received.

For the aggregation certainty factor of A-05 and A-06 in the above situation, the management program 105 selects A-5, the certainty factor of which will be higher within the analysis result information, makes this the aggregation certainty factor, and adopts the result of A-5 for the cause location list. Therefore, the aggregation certainty factor is registered in the aggregation analysis result information T1 as in L104. In accordance with this, it becomes possible to subject redundant analysis results to filtering, thereby making it possible to select and display only more accurate, highly precise analysis results.

Figure 23:
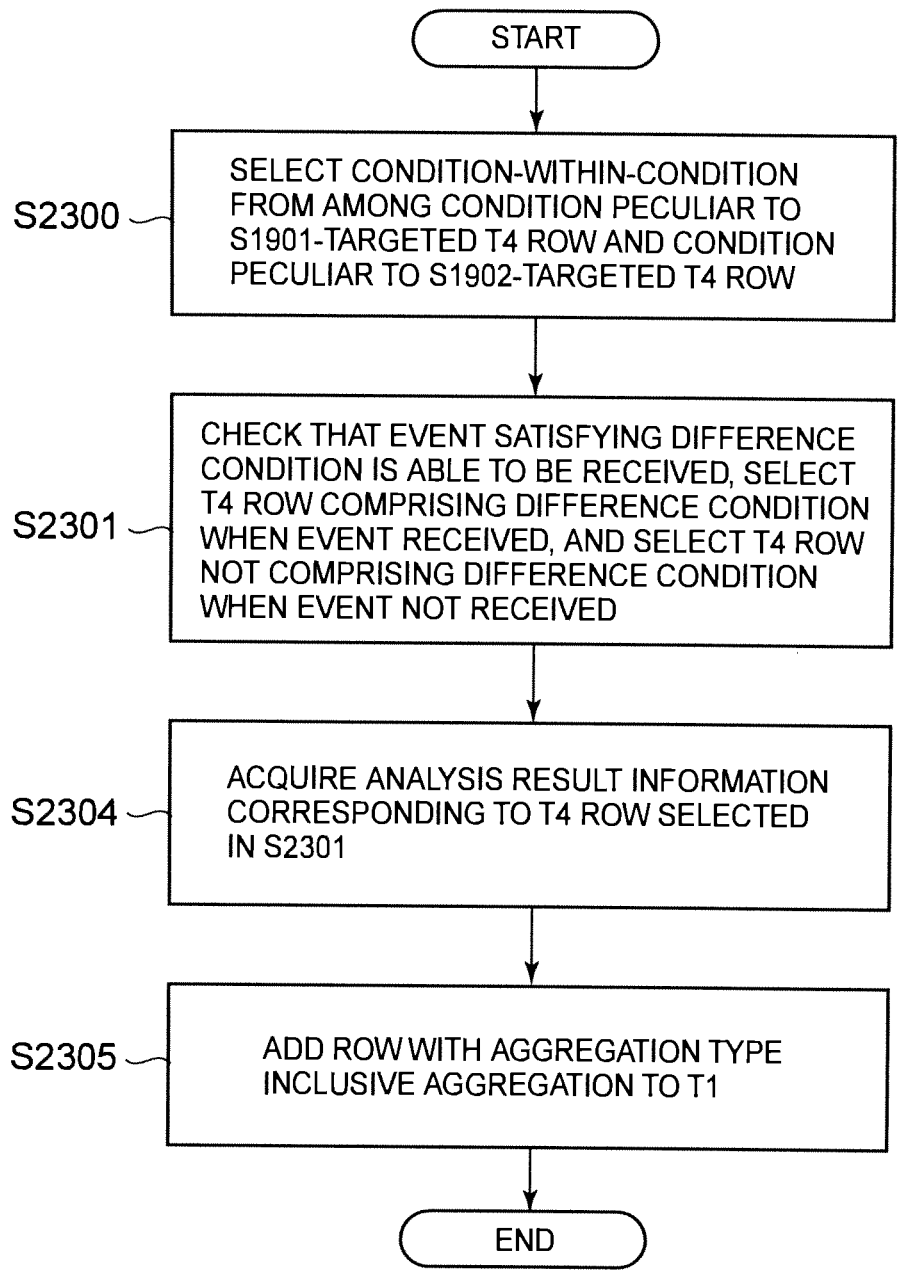
FIG. 23 is a diagram showing the detailed flow of processing in the flowchart of FIG. 20 for inclusive aggregation in particular.

Next, the processing steps of FIG. 23, which details the process for registering data in the T1 with respect to the inclusive aggregation of Step S2006 of FIG. 20, will be explained. An explanation of the processing flow will be given below.

(Step S2300) The management program 105 selects a condition within a condition from among the condition peculiar to the S1901-targeted T4 row and the condition peculiar to the S1902-targeted T4 row determined in Step S2000. Furthermore, in the following explanation, the above-mentioned selected condition will be called the difference condition, either the S1901-targeted T4 row or the S1902-targeted T4 row that comprises the difference condition in the applied condition list C402 will be called the parent condition T4 row, and the T4 row that does not comprise this difference condition will be called the child condition T4 row. When using these names, the applied condition list C402 of the parent condition T4 row will become the list that adds the difference condition to the applied condition list C402 of the child condition T4 row.

(Step S2301) The management program 105 checks whether it is possible to receive an event that satisfies at the least one of the difference conditions, and in a case where it is possible to receive at the least one such event, selects the parent condition T4 row, and in a case where it is not possible to do so, selects the child condition T4 row.

(Step S2304) The management program 105 acquires the corresponding analysis result information 102 from the analysis ID of the T4 row selected in Step 2301.

(Step S2305) The management program 105 adds the row having inclusive aggregation as the aggregation type to the T1. The values of the respective columns of the added T1 row are as follows.

Aggregation certainty factor: Stores the certainty factor of the analysis result information 102 acquired in Step S2304.

Cause location list: Stores the cause location information that combines the cause apparatus information and the cause component information of the analysis result information 102 acquired in Step S2304.

Analysis results list: First stores the analysis ID of the analysis result information 102 acquired in Step S2304, and next stores the analysis ID of one more piece of analysis result information 102.

The registration of data in the T1 with respect to the inclusive aggregation is completed in accordance with the above Steps.

The examples of analysis result information A-07 and A-08 are such that in the R-5 and R-6 condition sets of the analysis rules corresponding thereto, the R-5 condition set includes the R-6 condition set. The condition common to R-5 and R-6 is the storage subsystem FC port error, and the condition that exists only in R-5 is the storage subsystem controller error. In a case where the controller error condition occurs here, the R-5 analysis result information is adopted and selectively displayed, and in a case where the controller error condition does not occur, the R-6 analysis result information is adopted and selectively displayed.

Therefore, this information is registered in the T1 as in L4. In accordance with this, it becomes possible to select and display inter-rule analysis results having an inclusive relation in which the analysis results have the optimum granularity in accordance with the information capable of being analyzed.

<3.4. Display Process>

Figure 24:
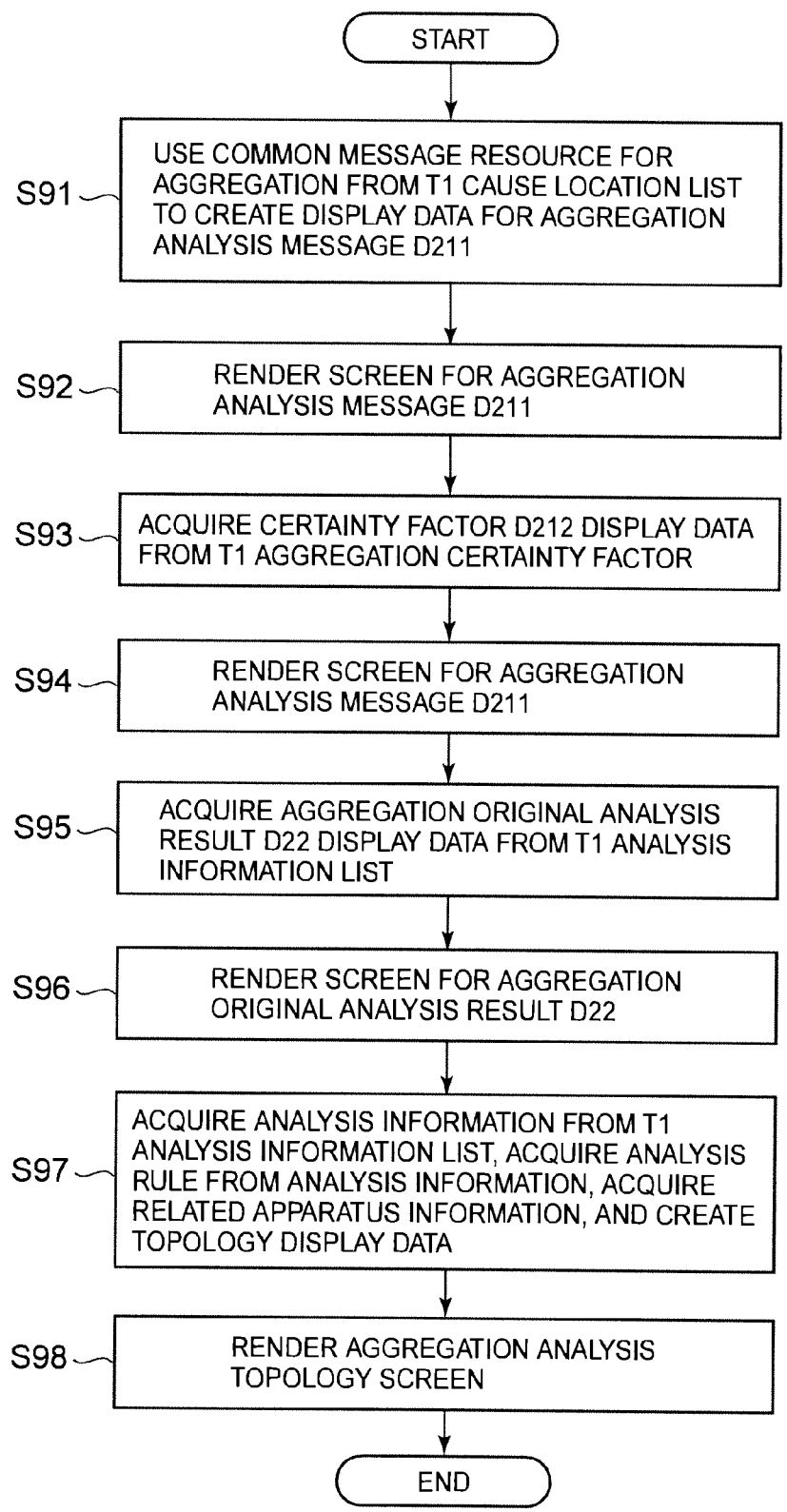
FIG. 24 is a diagram showing the flow of processing for displaying the aggregation analysis result on a screen.

Next, FIG. 24, which details processing for determining how a screen display should be carried out in accordance with the aggregation analysis result information of the created T4, will be explained. This processing may be carried out as part of the sequence of processes from analysis to display in FIG. 16, and, in addition, may be started based on a screen display request from the administrator of the management server 1. The flow of processing will be explained below.

(Step S91) The management program 105 uses a common message resource for aggregation from the cause location list C103 of the aggregation analysis result information T1 to create display data for an aggregation analysis message D211. The management program 105 prepares beforehand a highly versatile common message resource for aggregation comprising a cause location, a cause component and a certainty factor. For example, the management program 105 prepares and uses a message such as "Cause is failure in component (YYY) of apparatus (XXX). (Certainty factor: ZZ %)".

(Step S92) The management program 105 renders the aggregation analysis message D211 screen based on the D211 display data created in Step S91.

(Step S93) The management program 105 acquires the display data of the certainty factor D212 from the aggregation certainty factor of the aggregation analysis result information T1.

(Step S94) The management program 105 renders the certainty factor D212 screen on the basis of the display data acquired in Step S93.

(Step S95) The management program 105 acquires the display data of the aggregation original analysis result D22 from the analysis information list of the aggregation analysis result information T1.

(Step S96) The management program 105 renders the aggregation original analysis result D22 on the basis of the display data acquired in Step S95.

(Step S97) The management program 105 acquires the analysis ID from the analysis result list of the aggregation analysis result information T1, acquires the analysis result information 102 from the analysis ID, acquires the related apparatus information from the management apparatus composition information 103, and creates topology display data.

(Step S98) The management program 105 renders the aggregation analysis topology screen on the basis of the topology display data created in Step S97.

In accordance with the above-described steps, it is possible to use the aggregation analysis result information T1 to achieve a screen for displaying failure analysis result information that is aggregated on the screen.

Furthermore, in this example, the statuses of the monitoring target information processing apparatus and the components of this apparatus are obtained using information related to a received event. However, as another embodiment, the management program 105 may obtain the above-mentioned statuses by repeatedly querying the monitoring target information processing apparatus, and may store from among the repeatedly obtained statuses the status acquired last for the same apparatuses or the same components of the same apparatuses in the event management information (may be called apparatus status management information in a case where the statuses of the respective apparatuses and components are stored). In accordance with this, the expression "unreceived event" may be restated as "the management program 105 is unable to discern the status".

The above has been an explanation of a management system, which, in this example, comprises a network interface for receiving management information from the above-mentioned information processing apparatus, a processor for determining the status of the above-mentioned information processing apparatus based on the above-mentioned management information, a memory for storing the status of the above-mentioned information processing apparatus and a plurality of analysis rule information for identifying a cause apparatus, which is the cause of the above-mentioned status, and a display device for displaying the status of the above-mentioned information processing apparatus.

Furthermore, as was also explained:
(A) The above-mentioned memory stores a plurality of analysis result information, which is created on the basis of the above-mentioned analysis rule information, and which includes cause information denoting the cause of the above-mentioned cause apparatus, one or more status conditions related to the above-mentioned information processing apparatus for identifying the above-mentioned cause apparatus using sufficient conditions, a certainty factor representing the likelihood of the above-mentioned cause information, and one or more detected statuses that satisfy either all or a portion of the above-mentioned one or more status conditions;
(B) the above-mentioned processor selects a plurality of aggregation-targeted analysis result information from the above-mentioned plurality of analysis result information based on either the above-mentioned cause information, the above-mentioned one or more status conditions, or the above-mentioned one or more detected statuses included in the above-mentioned analysis result information;
(C) the above-mentioned processor creates post aggregation cause information based on the above-mentioned cause information included in the above-mentioned aggregation-targeted plurality of analysis result information;
(D) the above-mentioned processor computes a post-aggregation certainty factor based on the above-mentioned certainty factor included in the above-mentioned aggregation-targeted plurality of analysis result information; and
(E) the above-mentioned display device displays the above-mentioned post-aggregation cause information and post-aggregation certainty factor.

Further, as was also explained, the status of the above-mentioned information processing apparatus may be either the status of a component, which is either the logical or physical component of the above-mentioned information processing apparatus, or the apparatus status of the above-mentioned information processing apparatus, and the above-mentioned cause information may be either information related to the above-mentioned component or to apparatus information of the above-mentioned information processing apparatus.

Further, as was also explained, the above-mentioned aggregation-targeted plurality of analysis result information comprise first aggregation target analysis result information and second aggregation target analysis result information, either the cause apparatus or the cause component denoted by the cause information of the above-mentioned first aggregation target analysis result information and the cause apparatus or the cause component denoted by the cause information of the above-mentioned second aggregation target analysis result information are the same, and the above-mentioned post-aggregation certainty factor may be either the certainty factor of the above-mentioned first aggregation target analysis result information or the certainty factor of the above-mentioned second aggregation target analysis result information, whichever has the higher likelihood.

Further, as was also explained, the above-mentioned aggregation-targeted plurality of analysis result information comprise first aggregation target analysis result information and second aggregation target analysis result information, the one or more status conditions of the above-mentioned first aggregation target analysis result information and the one or more status conditions of the above-mentioned second aggregation target analysis result information comprise a common status condition and a difference condition, the conditional status of which differs for either common information processing apparatuses or common components, in a case where one or more detected statuses of the above-mentioned first aggregation target analysis result information satisfy at the least one of the difference conditions of the one or more status conditions of the above-mentioned first aggregation target analysis result information, the above-mentioned post-aggregation certainty factor is the certainty factor of the above-mentioned first aggregation target analysis result information and the above-mentioned post-aggregation cause information is display information based on the cause information of the above-mentioned first aggregation target analysis result information, and in a case where one or more detected statuses of the above-mentioned second aggregation target analysis result information satisfy at the least one of the difference conditions of the one or more status conditions of the above-mentioned second aggregation target analysis result information, the above-mentioned post-aggregation certainty factor is the certainty factor of the above-mentioned second aggregation target analysis result information and the above-mentioned post-aggregation cause information is display information based on the cause information of the above-mentioned second aggregation target analysis result information.

Further, as was also explained, the above-mentioned aggregation-targeted plurality of analysis result information comprise first aggregation target analysis result information and second aggregation target analysis result information, one or more status conditions of the above-mentioned first aggregation target analysis result information and one or more status conditions of the above-mentioned second aggregation target analysis result information comprise a common status condition and a difference condition, the conditional status of which differs for either common information processing apparatuses or common components, in a case where one or more detected statuses of the above-mentioned first aggregation target analysis result information and one or more detected statuses of the above-mentioned first aggregation target analysis result information do not satisfy either one or more status conditions of the above-mentioned first aggregation target analysis result information included in the above-mentioned difference condition or one or more status conditions of the above-mentioned first aggregation target analysis result information included in the above-mentioned difference condition, the above-mentioned post-aggregation certainty factor may be the sum of the certainty factor of the above-mentioned first aggregation target analysis result information and the certainty factor of the above-mentioned first aggregation target analysis result information, and the above-mentioned post aggregation cause information may be display information based on the cause information of the above-mentioned first aggregation target analysis result information and the cause information of the above-mentioned first aggregation target analysis result information.

Further, as was also explained, the above-mentioned aggregation-targeted plurality of analysis result information comprise first aggregation target analysis result information and second aggregation target analysis result information, and in a case where one or more status conditions of the above-mentioned first aggregation target analysis result information is composed of all of the one or more status conditions of the above-mentioned second aggregation target analysis result information and another status condition, and one or more detected statuses of the above-mentioned first aggregation target analysis result information satisfy the above-mentioned other status condition, the above-mentioned post-aggregation certainty factor may be the certainty factor of the above-mentioned first aggregation target analysis result information and the above-mentioned post-aggregation cause information may be display information based on the cause information of the above-mentioned first aggregation target analysis result information, and in a case where the one or more detected statuses of the above-mentioned first aggregation target analysis result information do not satisfy any of the above-mentioned other status conditions, the above-mentioned post-aggregation certainty factor may be the certainty factor of the above-mentioned second aggregation target analysis result information and the above-mentioned post aggregation cause information may be display information based on the cause information of the above-mentioned second aggregation target analysis result information.

Further, as was also explained, in a case where the above-mentioned display device displays the cause information of the above-mentioned second aggregation target analysis result information, the above-mentioned display device may display the above-mentioned post-aggregation certainty factor as the corresponding certainty factor.

However, this example also discloses items in addition thereto.

REFERENCE SIGNS LIST

1 Management server
2 Memory
11 Processor
13 Network I/F

The invention claimed is:

1. A management system that manages a plurality of information processing apparatuses, comprising:
  a network interface configured to receive management information from each information processing apparatus;
  a processor configured to determine a status of the information processing apparatus based on the management information;
  a memory storing the status of the information processing apparatus, and a plurality of analysis rule information for identifying a cause apparatus, which is a root cause of the status; and
  a display device displaying the status of the information processing apparatus,
  wherein the memory stores a plurality of analysis result information, each of which is created on the basis of the analysis rule information and includes:
    cause information denoting the root cause of failed apparatus,
    one or more status conditions related to the information processing apparatus for identifying the root cause apparatus using sufficient conditions,
    a certainty factor that represents likelihood of the root cause information, and
    one or more detected statuses that satisfy either all or a portion of the one or more status conditions,
  wherein the processor is configured to select a plurality of aggregation-targeted analysis result information from the plurality of the analysis result information,
  wherein the processor is configured to create post aggregation root cause information based on the root cause information included in the plurality of aggregation-targeted analysis result information,
  wherein the processor is configured to compute a post-aggregation certainty factor based on the certainty factor included in the plurality of aggregation-targeted analysis result information, and instead of displaying each of the plurality of aggregation-targeted analysis result information, to cause the display device to display the post aggregation root cause information and the post-aggregation certainty factor which is higher than a minimum of the certainty factors in the aggregation-targeted analysis result information.

2. A management system according to claim 1,
  wherein the status of the information processing apparatus is either the status of a component, which is either a logical or a physical component of the information processing apparatus, or the apparatus status of the information processing apparatus, and
  wherein the root cause information is either information related to the component or to apparatus information of the information processing apparatus.

3. A management system according to claim 1,
  wherein the plurality of aggregation-targeted analysis result information comprise first aggregation target analysis result information and second aggregation target analysis result information,
  wherein either a root cause apparatus or a root cause component denoted by the root cause information of the first aggregation target analysis result information and the root cause apparatus or the root cause component denoted by the root cause information of the second aggregation target analysis result information are the same, and
  wherein the post-aggregation certainty factor is either the certainty factor of the first aggregation target analysis result information or the certainty factor of the second aggregation target analysis result information, whichever has the higher likelihood.

4. A management system that manages a plurality of information processing apparatuses, comprising:
  a network interface configured to receive management information from each information processing apparatus;
  a processor configured to determine a status of the information processing apparatus based on the management information;
  a memory storing the status of the information processing apparatus, and a plurality of analysis rule information for identifying a cause apparatus, which is a root cause of the status; and
  a display device displaying the status of the information processing apparatus,
  wherein the memory stores a plurality of analysis result information, each of which is created on the basis of the analysis rule information and includes:

cause information denoting the root cause of failed apparatus,
one or more status conditions related to the information processing apparatus for identifying the root cause apparatus using sufficient conditions,
a certainty factor that represents likelihood of the root cause information, and
one or more detected statuses that satisfy either all or a portion of the one or more status conditions,
wherein the processor is configured to select a plurality of aggregation-targeted analysis result information from the plurality of the analysis result information,
wherein the processor is configured to create post aggregation root cause information based on the root cause information included in the plurality of aggregation-targeted analysis result information,
wherein the processor is configured to compute a post-aggregation certainty factor based on the certainty factor included in the plurality of aggregation-targeted analysis result information, and to cause the display device to display the post aggregation root cause information and the post-aggregation certainty factor,
wherein the plurality of aggregation-targeted analysis result information comprise first aggregation target analysis result information and second aggregation target analysis result information,
wherein one or more status conditions of the first aggregation target analysis result information and one or more status conditions of the second aggregation target analysis result information comprise a common status condition and a difference condition, the conditional status of which differs for either common information processing apparatuses or common components,
wherein, in a case where one or more detected statuses of the first aggregation target analysis result information satisfy at the least one difference condition of the one or more status conditions of the first aggregation target analysis result information, the post-aggregation certainty factor is the certainty factor of the first aggregation target analysis result information and the post-aggregation root cause information is display information based on the root cause information of the first aggregation target analysis result information, and
wherein, in a case where one or more detected statuses of the second aggregation target analysis result information satisfy at the least one difference condition of the one or more status conditions of the second aggregation target analysis result information, the post-aggregation certainty factor is the certainty factor of the second aggregation target analysis result information and the post aggregation root cause information is display information based on the root cause information of the second aggregation target analysis result information.

5. A management system according to claim 4,
wherein, in a case where the display device displays the root cause information of the second aggregation target analysis result information, the display device displays the post-aggregation certainty factor as the corresponding certainty factor.

6. A management system that manages a plurality of information processing apparatuses, comprising:
a network interface configured to receive management information from each information processing apparatus;
a processor configured to determine a status of the information processing apparatus based on the management information;
a memory storing the status of the information processing apparatus, and a plurality of analysis rule information for identifying a cause apparatus, which is a root cause of the status; and
a display device displaying the status of the information processing apparatus,
wherein the memory stores a plurality of analysis result information, each of which is created on the basis of the analysis rule information and includes:
cause information denoting the root cause of failed apparatus,
one or more status conditions related to the information processing apparatus for identifying the root cause apparatus using sufficient conditions,
a certainty factor that represents likelihood of the root cause information, and
one or more detected statuses that satisfy either all or a portion of the one or more status conditions,
wherein the processor is configured to select a plurality of aggregation-targeted analysis result information from the plurality of the analysis result information,
wherein the processor is configured to create post aggregation root cause information based on the root cause information included in the plurality of aggregation-targeted analysis result information,
wherein the processor is configured to compute a post-aggregation certainty factor based on the certainty factor included in the plurality of aggregation-targeted analysis result information, and to cause the display device to display the post aggregation root cause information and the post-aggregation certainty factor,
wherein the plurality of aggregation-targeted analysis result information comprise first aggregation target analysis result information and second aggregation target analysis result information,
wherein one or more status conditions of the first aggregation target analysis result information are composed of all of the one or more status conditions of the second aggregation target analysis result information and another status condition, wherein, in a case where one or more detected statuses of the first aggregation target analysis result information satisfy the other status condition, the post-aggregation certainty factor is the certainty factor of the first aggregation target analysis result information, and the post-aggregation root cause information is display information based on the root cause information of the first aggregation target analysis result information, and
wherein, in a case where the one or more detected statuses of the first aggregation target analysis result information do not satisfy any of the other status conditions, the post-aggregation certainty factor is the certainty factor of the second aggregation target analysis result information and the post-aggregation root cause information is display information based on the root cause information of the second aggregation target analysis result information.

7. A management system that manages a plurality of information processing apparatuses, comprising:
a network interface configured to receive management information from each information processing apparatus;
a processor configured to determine a status of the information processing apparatus based on the management information;

a memory storing the status of the information processing apparatus, and a plurality of analysis rule information for identifying a cause apparatus, which is a root cause of the status; and a display device displaying the status of the information processing apparatus, wherein the memory stores a plurality of analysis result information, each of which is created on the basis of the analysis rule information and includes:

cause information denoting the root cause of failed apparatus, one or more status conditions related to the information processing apparatus for identifying the root cause apparatus using sufficient conditions, a certainty factor that represents likelihood of the root cause information, and one or more detected statuses that satisfy either all or a portion of the one or more status conditions, wherein the processor is configured to select a plurality of aggregation-targeted analysis result information from the plurality of the analysis result information, wherein the processor is configured to create post aggregation root cause information based on the root cause information included in the plurality of aggregation-targeted analysis result information, wherein the processor is configured to compute a post-aggregation certainty factor based on the certainty factor included in the plurality of aggregation-targeted analysis result information, and to cause the display device to display the post aggregation root cause information and the post-aggregation certainty factor, wherein the plurality of aggregation-targeted analysis result information comprise first aggregation target analysis result information and second aggregation target analysis result information, wherein one or more status conditions of the first aggregation target analysis result information and one or more status conditions of the second aggregation target analysis result information comprise a common status condition and a difference condition, the conditional status of which differs for either common information processing apparatuses or common components, and wherein, in a case where one or more detected statuses of the first aggregation target analysis result information and one or more detected statuses of the first aggregation target analysis result information do not satisfy either one or more status conditions of the first aggregation target analysis result information included in the difference condition or one or more status conditions of the first aggregation target analysis result information included in the difference condition, the post-aggregation certainty factor is a sum of the certainty factor of the first aggregation target analysis result information and the certainty factor of the first aggregation target analysis result information, and the post aggregation root cause information is display information based on the root cause information of the first aggregation target analysis result information and the root cause information of the first aggregation target analysis result information.

8. A non-transitory computer readable storage medium having machine instructions stored therein, the instructions when executed by one or more processors, cause the one or more processors to perform operations comprising:

receiving management information from each information processing apparatus of a plurality of information processing apparatuses;

determining a status of the information processing apparatus based on the management information;

storing the status of the information processing apparatus, and a plurality of analysis rule information for identifying a cause apparatus, which is a root cause of the status; and displaying the status of the information processing apparatus, storing a plurality of analysis result information, wherein each of the analysis result information is created on the basis of the analysis rule information and includes:

cause information denoting the root cause of failed apparatus, one or more status conditions related to the information processing apparatus for identifying the root cause apparatus using sufficient conditions, a certainty factor that represents likelihood of the root cause information, and one or more detected statuses that satisfy either all or a portion of the one or more status conditions, selecting a plurality of aggregation-targeted analysis result information from the plurality of the analysis result information;

creating post aggregation root cause information based on the root cause information included in the plurality of aggregation-targeted analysis result information, computing a post-aggregation certainty factor based on the certainty factor included in the plurality of aggregation-targeted analysis result information, and instead of displaying each of the plurality of aggregation-targeted analysis result information, displaying the post aggregation root cause information and the post-aggregation certainty factor which is higher than a minimum of the certainty factors in the aggregation-targeted analysis result information.

9. The computer readable storage medium according to claim 8, wherein the status of the information processing apparatus is either the status of a component, which is either a logical or a physical component of the information processing apparatus, or the apparatus status of the information processing apparatus, and wherein the root cause information is either information related to the component or to apparatus information of the information processing apparatus.

10. The computer readable storage medium according to claim 8, wherein the plurality of aggregation-targeted analysis result information comprise first aggregation target analysis result information and second aggregation target analysis result information, wherein either a root cause apparatus or a root cause component denoted by the root cause information of the first aggregation target analysis result information and the root cause apparatus or the root cause component denoted by the root cause information of the second aggregation target analysis result information are the same, and wherein the post-aggregation certainty factor is either the certainty factor of the first aggregation target analysis result information or the certainty factor of the second aggregation target analysis result information, whichever has the higher likelihood.

11. A non-transitory computer readable storage medium having machine instructions stored therein, the instructions when executed by one or more processors, cause the one or more processors to perform operations comprising:

receiving management information from each information processing apparatus among a plurality of information processing apparatuses;

determining a status of the information processing apparatus based on the management information;

storing the status of the information processing apparatus, and a plurality of analysis rule information for identifying a cause apparatus, which is a root cause of the status; and displaying the status of the information processing apparatus, storing a plurality of analysis result information, wherein each of the analysis result information is created on the basis of the analysis rule information and includes:

cause information denoting the root cause of failed apparatus, one or more status conditions related to the information processing apparatus for identifying the root cause apparatus using sufficient conditions, a certainty factor that represents likelihood of the root cause information, and one or more detected statuses that satisfy either all or a portion of the one or more status conditions, selecting a plurality of aggregation-targeted analysis result information from the plurality of the analysis result information;

creating post aggregation root cause information based on the root cause information included in the plurality of aggregation-targeted analysis result information, computing a post-aggregation certainty factor based on the certainty factor included in the plurality of aggregation-targeted analysis result information, and displaying the post aggregation root cause information and the post-aggregation certainty factor.

wherein the plurality of aggregation-targeted analysis result information comprise first aggregation target analysis result information and second aggregation target analysis result information, wherein one or more status conditions of the first aggregation target analysis result information and one or more status conditions of the second aggregation target analysis result information comprise a common status condition and a difference condition, the conditional status of which differs for either common information processing apparatuses or common components, wherein, in a case where one or more detected statuses of the first aggregation target analysis result information satisfy at the least one difference condition of the one or more status conditions of the first aggregation target analysis result information, the post-aggregation certainty factor is the certainty factor of the first aggregation target analysis result information and the post-aggregation root cause information is display information based on the root cause information of the first aggregation target analysis result information, and wherein, in a case where one or more detected statuses of the second aggregation target analysis result information satisfy at the least one difference condition of the one or more status conditions of the second aggregation target analysis result information, the post-aggregation certainty factor is the certainty factor of the second aggregation target analysis result information and the post aggregation root cause information is display information based on the root cause information of the second aggregation target analysis result information.

12. A non-transitory computer readable storage medium according to claim 11, further comprising instructions in the computer readable storage medium:

in a case displaying the root cause information of the second aggregation target analysis result information, displaying the post-aggregation certainty factor as the corresponding certainty factor.

13. A non-transitory computer readable storage medium having machine instructions stored therein, the instructions when executed by one or more processors, cause the one or more processors to perform operations comprising:

receiving management information from each information processing apparatus among a plurality of information processing apparatuses;

determining a status of the information processing apparatus based on the management information;

storing the status of the information processing apparatus, and a plurality of analysis rule information for identifying a cause apparatus, which is a root cause of the status; and displaying the status of the information processing apparatus, storing a plurality of analysis result information, wherein each of the analysis result information is created on the basis of the analysis rule information and includes:

cause information denoting the root cause of failed apparatus, one or more status conditions related to the information processing apparatus for identifying the root cause apparatus using sufficient conditions, a certainty factor that represents likelihood of the root cause information, and one or more detected statuses that satisfy either all or a portion of the one or more status conditions, selecting a plurality of aggregation-targeted analysis result information from the plurality of the analysis result information;

creating post aggregation root cause information based on the root cause information included in the plurality of aggregation-targeted analysis result information, computing a post-aggregation certainty factor based on the certainty factor included in the plurality of aggregation-targeted analysis result information, and displaying the post aggregation root cause information and the post-aggregation certainty factor, wherein the plurality of aggregation-targeted analysis result information comprise first aggregation target analysis result information and second aggregation target analysis result information, wherein one or more status conditions of the first aggregation target analysis result information and one or more status conditions of the second aggregation target analysis result information comprise a common status condition and a difference condition, the conditional status of which differs for either common information processing apparatuses or common components, and wherein, in a case where one or more detected statuses of the first aggregation target analysis result information and one or more detected statuses of the first aggregation target analysis result information do not satisfy either one or more status conditions of the first aggregation target analysis result information included in the difference condition or one or more status conditions of the first aggregation target analysis result information included in the difference condition, the post-aggregation certainty factor is a sum of the certainty factor of the first aggregation target analysis result information and the certainty factor of the first aggregation target analysis result information, and the post aggregation root cause information is display information based on the root cause information of the first aggregation target analysis result information and the root cause information of the first aggregation target analysis result information.

14. A non-transitory computer readable storage medium having machine instructions stored therein, the instructions when executed by one or more processors, cause the one or more processors to perform operations comprising:
   receiving management information from each information processing apparatus among a plurality of information processing apparatuses;
   determining a status of the information processing apparatus based on the management information;
   storing the status of the information processing apparatus, and a plurality of analysis rule information for identifying a cause apparatus, which is a root cause of the status; and
   displaying the status of the information processing apparatus,
   storing a plurality of analysis result information, wherein each of the analysis result information is created on the basis of the analysis rule information and includes:
      cause information denoting the root cause of failed apparatus,
      one or more status conditions related to the information processing apparatus for identifying the root cause apparatus using sufficient conditions,
      a certainty factor that represents likelihood of the root cause information, and
      one or more detected statuses that satisfy either all or a portion of the one or more status conditions,
   selecting a plurality of aggregation-targeted analysis result information from the plurality of the analysis result information;
   creating post aggregation root cause information based on the root cause information included in the plurality of aggregation-targeted analysis result information,
   computing a post-aggregation certainty factor based on the certainty factor included in the plurality of aggregation-targeted analysis result information, and
   displaying the post aggregation root cause information and the post-aggregation certainty factor,
      wherein the plurality of aggregation-targeted analysis result information comprise first aggregation target analysis result information and second aggregation target analysis result information,
      wherein one or more status conditions of the first aggregation target analysis result information are composed of all of the one or more status conditions of the second aggregation target analysis result information and another status condition,
   wherein, in a case where one or more detected statuses of the first aggregation target analysis result information satisfy the other status condition, the post-aggregation certainty factor is the certainty factor of the first aggregation target analysis result information, and the post-aggregation root cause information is display information based on the root cause information of the first aggregation target analysis result information, and
      wherein, in a case where the one or more detected statuses of the first aggregation target analysis result information do not satisfy any of the other status conditions, the post-aggregation certainty factor is the certainty factor of the second aggregation target analysis result information and the post-aggregation root cause information is display information based on the root cause information of the second aggregation target analysis result information.

* * * * *